(12) United States Patent
Yoshida et al.

(10) Patent No.: US 9,403,998 B2
(45) Date of Patent: Aug. 2, 2016

(54) COMPOSITE STRUCTURE, PRODUCT USING SAME, AND METHOD FOR PRODUCING COMPOSITE STRUCTURE

(71) Applicant: KURARAY CO., LTD., Kurashiki-shi (JP)

(72) Inventors: Kentaro Yoshida, Houston, TX (US); Ryoichi Sasaki, Kurashiki (JP); Mamoru Omoda, Soja (JP); Wataru Hirose, Kurashiki (JP); Manabu Shibata, Kurashiki (JP); Tatsuya Oshita, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 116 days.

(21) Appl. No.: 14/349,809

(22) PCT Filed: Oct. 5, 2012

(86) PCT No.: PCT/JP2012/006433
§ 371 (c)(1),
(2) Date: Apr. 4, 2014

(87) PCT Pub. No.: WO2013/051287
PCT Pub. Date: Apr. 11, 2013

(65) Prior Publication Data
US 2014/0248500 A1 Sep. 4, 2014

(30) Foreign Application Priority Data
Oct. 5, 2011 (JP) .................................. 2011-221096

(51) Int. Cl.
| C09D 7/12 | (2006.01) |
| C09D 185/02 | (2006.01) |
| C09D 1/00 | (2006.01) |
| C08J 7/06 | (2006.01) |

(52) U.S. Cl.
CPC ................. *C09D 7/1233* (2013.01); *C08J 7/06* (2013.01); *C09D 1/00* (2013.01); *C09D 7/12* (2013.01); *C09D 7/1216* (2013.01); *C09D 185/02* (2013.01); *C08J 2367/02* (2013.01); *C08J 2377/00* (2013.01); *Y10T 428/31739* (2015.04); *Y10T 428/31746* (2015.04); *Y10T 428/31786* (2015.04); *Y10T 428/31797* (2015.04)

(58) Field of Classification Search
None
See application file for complete search history.

(56) References Cited

U.S. PATENT DOCUMENTS

| 6,284,682 | B1 | 9/2001 | Troczynski et al. |
| 6,886,240 | B2 * | 5/2005 | Zhang .................... C23C 16/40 29/623.5 |
| 8,617,703 | B2 | 12/2013 | Hirose et al. |
| 2005/0175831 | A1 | 8/2005 | Kim et al. |
| 2006/0293448 | A1 | 12/2006 | Nishiura et al. |
| 2007/0267135 | A1 | 11/2007 | Kim et al. |
| 2008/0057336 | A1 * | 3/2008 | Kurokawa ............... C25D 11/00 428/639 |
| 2009/0171003 | A1 | 7/2009 | Nishiura et al. |
| 2010/0062246 | A1 | 3/2010 | Kim et al. |
| 2011/0027580 | A1 | 2/2011 | Hirose et al. |
| 2012/0073971 | A1 * | 3/2012 | Prieto .................... C25D 13/02 204/490 |
| 2013/0034674 | A1 | 2/2013 | Yoshida et al. |

FOREIGN PATENT DOCUMENTS

| EP | 2 266 794 A1 | 12/2010 |
| EP | 2 554 367 A1 | 2/2013 |
| GB | 1 411 596 A | 10/1975 |
| GB | 2 155 402 A | 9/1985 |
| JP | 55-046969 A | 4/1980 |
| JP | 2003-508627 A | 3/2003 |
| JP | 2006-116737 A | 5/2006 |
| JP | 2006-515535 A | 6/2006 |
| JP | 2007-523769 A | 8/2007 |
| JP | 2008-516015 A | 5/2008 |
| JP | 4961054 B2 | 6/2012 |
| WO | WO 01/16052 A2 | 3/2001 |
| WO | WO 2005/003033 A2 | 1/2005 |
| WO | WO 2005/074398 A2 | 8/2005 |
| WO | WO 2006/042116 A2 | 4/2006 |
| WO | WO 2009/125800 A1 | 10/2009 |
| WO | WO 2011/122036 A1 | 10/2011 |

OTHER PUBLICATIONS

Extended European Search Report issued May 11, 2015 in Patent Application No. 12838271.0.
U.S. Appl. No. 14/349,594, filed Apr. 3, 2014, Sasaki, et al.
U.S. Appl. No. 14/349,251, filed Apr. 2, 2014, Sasaki, et al.
International Search Report issued Nov. 20, 2012 in PCT/JP2012/006433.

* cited by examiner

*Primary Examiner* — David Sample
(74) *Attorney, Agent, or Firm* — Oblon, McClelland, Maier & Neustadt, L.L.P.

(57) ABSTRACT

A composite structure disclosed includes a base (X) and a layer (Y) stacked on the base (X). The layer (Y) includes a reaction product (R). The reaction product (R) is a reaction product formed by a reaction at least between a metal oxide (A) and a phosphorus compound (B). A peak for a binding energy of an oxygen-atom 1s orbital observed by X-ray photoelectron spectroscopy of the layer (Y) is located at 532.0 eV or higher, and the peak has a half width of less than 2.0 eV.

26 Claims, No Drawings

COMPOSITE STRUCTURE, PRODUCT USING SAME, AND METHOD FOR PRODUCING COMPOSITE STRUCTURE

TECHNICAL FIELD

The present invention relates to a composite structure, a product using the composite structure, and a method for producing a composite structure.

BACKGROUND ART

A coating film including, as constituents, atoms of a metal such as aluminum and phosphorus atoms is conventionally known. For example, there is known an organic polymer formed product having a gas permeation-preventing coating film made of a metal orthophosphate whose main constituent is aluminum (Patent Literature 1: JP 55(1980)-46969 A). JP 55(1980)-46969 A discloses a method for forming a gas permeation-preventing coating film by applying a dispersion liquid or a solution of a metal orthophosphate to an organic polymer formed product. JP 55(1980)-46969 A discloses a method for forming a dispersion liquid or a solution of a metal orthophosphate, the method consisting of respectively dissolving an aluminum ion source and a phosphorus ion source in separate media, and then mixing the resultant solutions together.

There is also known a layered film with gas barrier properties in which an inorganic oxide-deposited layer is provided on a base film formed of a plastic film, and a coating layer of a metal phosphate is provided on the inorganic oxide-deposited layer (Patent Literature 2: JP 2006-116737 A). JP 2006-116737 A discloses a method for forming a coating layer of a metal phosphate, the method consisting of applying a particular coating liquid obtained by mixing of a phosphate ion-containing solution and a metal ion-containing solution.

There is also known a method using aluminophosphate in order to reduce the surface roughness of a base made of iron, glass, or the like (see Patent Literature 3: JP 2006-515535 T). JP 2006-515535 T discloses a method for forming an amorphous aluminophosphate compound on a base made of iron, glass or the like by applying onto the base an aluminophosphate compound precursor including aluminum ions and a phosphoric acid ester in a liquid medium.

Furthermore, there is known a composite body composed of: a base made of metal, metal alloy, plastic or the like; and a coating component including a particular aluminum phosphate compound (see Patent Literature 4: JP 2008-516015 T). JP 2008-516015 T discloses a method for forming a coating using a solution including an aluminum salt and a phosphoric acid ester in an organic solvent.

CITATION LIST

Patent Literature

Patent Literature 1: JP 55(1980)-46969 A
Patent Literature 2: JP 2006-116737 A
Patent Literature 3: JP 2006-515535 T
Patent Literature 4: JP 2008-516015 T

SUMMARY OF INVENTION

Technical Problem

However, the above conventional coating layers do not have sufficient water vapor barrier properties. Particularly, in the case of use under severe conditions such as high-temperature and high-humidity conditions, the water vapor barrier properties tend to decrease over time, and the range of uses is therefore considerably limited. For example, back sheets used in solar cell panels are required to maintain their water vapor barrier properties over a long period of time not only under general evaluation conditions of 40° C. and 90% RH but under more severe conditions of 85° C. and 85% RH. However, the above conventional coating layers cannot fully meet such a requirement.

It is therefore one object of the present invention to provide a composite structure that is excellent in water vapor barrier properties and appearance and that can maintain the water vapor barrier properties at a high level over a long period of time even when used at high temperature and high humidity, and to provide a method for producing the composite structure. In addition, another object of the present invention is to provide a product including the composite structure. In the present specification, the capability to maintain the water vapor barrier properties at a high level over a long period of time may be expressed as "stability of water vapor barrier properties".

Solution to Problem

As a result of a diligent study to attain the above objects, the present inventors have found that the use of a particular coating liquid allows formation of a coating layer that is excellent in water vapor barrier properties and appearance and that can maintain the water vapor barrier properties at a high levels over a long period of time even when used at high temperature and high humidity. The coating liquid is one obtained by mixing fine particles of a metal oxide with a phosphorus compound, and the metal oxide fine particles are those obtained by hydrolytic condensation of a compound containing a metal atom to which a hydrolyzable characteristic group is bonded. Through a further study based on the new findings, the present inventors have completed the present invention.

That is, the composite structure of the present invention is a composite structure having a base (X) and a layer (Y) stacked on the base (X), the layer (Y) including a reaction product (R). The reaction product (R) is a reaction product formed by a reaction at least between a metal oxide (A) and a phosphorus compound (B). A peak for a binding energy of an oxygen-atom 1s orbital observed by X-ray photoelectron spectroscopy of the layer (Y) is located at 532.0 eV or higher, and the peak has a half width of less than 2.0 eV.

In the number of atoms in the layer (Y) calculated by X-ray photoelectron spectroscopy of the layer (Y), a sum of the number of metal atoms (M) that are constituents of the metal oxide (A), the number of oxygen atoms, and the number of phosphorus atoms may account for 60% or more of the total number of atoms in the layer (Y).

The metal oxide (A) may be a hydrolytic condensate of a compound (L) containing a metal atom (M) to which a hydrolyzable characteristic group is bonded. In this case, the compound (L) may include at least one compound ($L^1$) represented by the following formula (I):

$$M^1 X^1_m R^1_{(n-m)} \qquad \text{(I), where:}$$

$M^1$ is a metal atom selected from the group consisting of Al, Ti, and Zr; $X^1$ is selected from the group consisting of F, Cl, Br, I, $R^2O-$, $R^3C(=O)O-$, $(R^4C(=O))_2CH-$, and $NO_3$; $R^1$, $R^2$, $R^3$, and $R^4$ are each selected from the group consisting of an alkyl group, an aralkyl group, an aryl group, and an alkenyl group; n is equal to a valence of $M^1$; and m represents an integer from 1 to n.

When a plurality of $X^1$ are included in the formula (I), the plurality of $X^1$ may be the same as or different from each other. When a plurality of $R^1$ are included in the formula (I), the plurality of $R^1$ may be the same as or different from each other. When a plurality of $R^2$ are included in the formula (I), the plurality of $R^2$ may be the same as or different from each other. When a plurality of $R^3$ are included in the formula (I), the plurality of $R^3$ may be the same as or different from each other. When a plurality of $R^4$ are included in the formula (I), the plurality of $R^4$ may be the same as or different from each other.

The metal atom $M^1$ in the formula (I) may be aluminum. A peak for a binding energy of an aluminum-atom 2p orbital observed by X-ray photoelectron spectroscopy of the layer (Y) may be located at 74.5 eV or higher, and the peak may have a half width of less than 2.0 eV.

The compound ($L^1$) may include at least one compound selected from aluminum triisopropoxide and aluminum tri-s-butoxide.

The phosphorus compound (B) may contain a plurality of sites capable of reacting with the metal oxide (A).

The phosphorus compound (B) may be at least one compound selected from the group consisting of phosphoric acid, polyphosphoric acid, phosphorous acid, phosphonic acid, and derivatives thereof.

In the layer (Y), the number of moles $N_M$ of metal atoms (M) that are constituents of the metal oxide (A) and the number of moles $N_P$ of phosphorus atoms derived from the phosphorus compound (B) may satisfy a relation of $1.0 \leq$ (the number of moles $N_M$)/(the number of moles $N_P$)$\leq 3.6$.

The layer (Y) may further include a polymer (C) containing at least one functional group (f) selected from the group consisting of a hydroxyl group, a carboxyl group, a carboxylic acid anhydride group, and a salt of a carboxyl group.

The polymer (C) may be at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

The base (X) may include at least one layer selected from the group consisting of a thermoplastic resin film layer, a paper layer, and an inorganic deposited layer.

In the composite structure of the present invention, the layer (Y) may be stacked on both surfaces of the base (X).

In the composite structure of the present invention, a moisture permeability as measured under conditions of 40° C. and 90/0% RH may be 0.1 g/(m²·day) or less.

In the composite structure of the present invention, when a moisture permeability under conditions of 85° C. and 85/0% RH is measured continuously for 100 hours, an average moisture permeability during a period from 0 to 100 hours may be 5 g/(m²·day) or less.

In the composite structure of the present invention, when a moisture permeability under conditions of 85° C. and 85/0% RH is measured continuously for 2000 hours, an average moisture permeability during a period from 1900 to 2000 hours may be 5 g/(m²·day) or less.

The product of the present invention is a product including the composite structure of the present invention. In the product, the composite structure is used as a packaging material, a solar cell component, or a display device component.

The method of the present invention for producing a composite structure including a base (X) and a layer (Y) stacked on the base (X) includes: a step (I) of mixing a metal oxide (A), at least one compound containing a site capable of reacting with the metal oxide (A), and a solvent, so as to prepare a coating liquid (U) including the metal oxide (A), the at least one compound, and the solvent; a step (II) of applying the coating liquid (U) onto the base (X) so as to form a precursor layer of the layer (Y) on the base (X); and a step (III) of subjecting the precursor layer to heat treatment at a temperature of 140° C. or more so as to form the layer (Y). The at least one compound includes a phosphorus compound (B). The coating liquid (U) is maintained at a temperature of 50° C. or less during a period from when the coating liquid (U) is prepared in the step (I) until the coating liquid (U) is applied in the step (II). In the coating liquid (U), the number of moles $N_M$ of metal atoms (M) that are constituents of the metal oxide (A) and the number of moles $N_P$ of phosphorus atoms included in the phosphorus compound (B) satisfy a relation of $1.0 \leq$ (the number of moles $N_M$)/(the number of moles $N_P$)$\leq 3.6$.

In one aspect, the production method of the present invention is a method for producing the composite structure of the present invention.

In the production method of the present invention, a viscosity of the coating liquid (U) to be applied in the step (II) as measured by a Brookfield rotational viscometer that is an SB-type viscometer using a rotor No. 3 operating at a rotational speed of 60 rpm may be 3000 mPa·s or less at a temperature at which the coating liquid (U) is applied.

In the production method of the present invention, the step (I) may include: a step (a) of preparing a liquid (S) including the metal oxide (A); a step (b) of preparing a solution (T) including the phosphorus compound (B); and a step (c) of mixing the liquid (S) and the solution (T). Both the liquid (S) and the solution (T) may have a temperature of 50° C. or less when mixed in the step (c).

In the production method of the present invention, the step (a) may include a step of subjecting, to condensation or hydrolytic condensation, at least one selected from the group consisting of: a compound (L) containing a metal atom (M) to which a hydrolyzable characteristic group is bonded; a partial hydrolysate of the compound (L); a complete hydrolysate of the compound (L); a partial hydrolytic condensate of the compound (L); and a condensate formed by condensation of a part of a complete hydrolysate of the compound (L).

In the production method of the present invention, the compound (L) may include at least one compound ($L^1$) represented by the following formula (I):

(I), where:

$M^1$ is a metal atom selected from the group consisting of Al, Ti, and Zr; $X^1$ is selected from the group consisting of F, Cl, Br, I, $R^2O—$, $R^3C(=O)O—$, $(R^4C(=O))_2CH—$, and $NO_3$; $R^1$, $R^2$, $R^3$, and $R^4$ are each selected from the group consisting of an alkyl group, an aralkyl group, an aryl group, and an alkenyl group; n is equal to a valence of $M^1$; and m represents an integer from 1 to n.

When a plurality of $X^1$ are included in the formula (I), the plurality of $X^1$ may be the same as or different from each other. When a plurality of $R^1$ are included in the formula (I), the plurality of $R^1$ may be the same as or different from each other. When a plurality of $R^2$ are included in the formula (I), the plurality of $R^2$ may be the same as or different from each other. When a plurality of $R^3$ are included in the formula (I), the plurality of $R^3$ may be the same as or different from each other. When a plurality of $R^4$ are included in the formula (I), the plurality of $R^4$ may be the same as or different from each other.

In the production method of the present invention, the compound ($L^1$) may include at least one compound selected from aluminum triisopropoxide and aluminum tri-s-butoxide.

In the production method of the present invention, the phosphorus compound (B) may contain a plurality of sites capable of reacting with the metal oxide (A).

In the production method of the present invention, the phosphorus compound (B) may be at least one compound selected from the group consisting of phosphoric acid, polyphosphoric acid, phosphorous acid, phosphonic acid, and derivatives thereof.

In the production method of the present invention, the coating liquid (U) may further include a polymer (C) containing at least one functional group (f) selected from the group consisting of a hydroxyl group, a carboxyl group, a carboxylic acid anhydride group, and a salt of a carboxyl group.

In the production method of the present invention, the polymer (C) may be at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

Advantageous Effects of Invention

According to the present invention, a composite structure having excellent water vapor barrier properties and having good appearance can be obtained. In addition, according to the production method of the present invention, the composite structure can easily be produced.

DESCRIPTION OF EMBODIMENTS

Hereinafter, embodiments of the present invention will be described. In the following description, specific materials (compounds etc.) are mentioned in some cases as examples of a material exhibiting a particular function. However, the present invention is not limited to embodiments using the specific materials. One of the materials mentioned as examples may be used alone or two or more thereof may be used in combination, unless otherwise specified.

[Composite Structure]

A composite structure of the present invention is a composite structure having a base (X) and a layer (Y) stacked on the base (X). The layer (Y) includes a reaction product (R), and the reaction product (R) is a reaction product formed by a reaction at least between a metal oxide (A) and a phosphorus compound (B). A peak for a binding energy of an oxygen-atom 1s orbital observed by X-ray photoelectron spectroscopy (XPS) of the layer (Y) is located at 532.0 eV or higher, and the peak has a half width of less than 2.0 eV. Such a composite structure can be obtained by a method of the present invention for producing a composite structure.

The peak for the binding energy of the oxygen-atom 1s orbital observed by X-ray photoelectron spectroscopy (XPS) of the layer (Y) is located in the range of, for example, 532.0 eV to 533.0 eV, and the half width of the peak is in the range of, for example, 1.4 eV to 1.9 eV.

In the number of atoms in the layer (Y) calculated by X-ray photoelectron spectroscopy (XPS) of the layer (Y), a sum of the number of metal atoms (M) that are constituents of the metal oxide (A), the number of oxygen atoms, and the number of phosphorus atoms may account for 60% or more of the total number of atoms in the layer (Y), and may account for, for example, 80% or more or 90% or more of the total number of atoms. It should be noted that hydrogen atoms and helium atoms which cannot be measured by X-ray photoelectron spectroscopy are not taken into consideration for the calculation of the proportion.

The metal oxide (A) may be a hydrolytic condensate of a compound (L) containing the metal atom (M) to which a hydrolyzable characteristic group is bonded. Examples of the characteristic group include $X^1$ of the formula (I) described later.

The hydrolytic condensate of the compound (L) can be regarded substantially as a metal oxide. Therefore, in the present specification, the hydrolytic condensate of the compound (L) may be referred to as the "metal oxide (A)". That is, in the present specification, the "metal oxide (A)" can be interpreted to mean the "hydrolytic condensate of the compound (L)", and the "hydrolytic condensate of the compound (L)" can be interpreted to mean the "metal oxide (A)".

The layer (Y) in the composite structure has a structure in which particles of the metal oxide (A) are bonded together via phosphorus atoms derived from the phosphorus compound (B). The concept of an embodiment in which the particles are bonded via phosphorus atoms includes an embodiment in which the particles are bonded via atomic groups including a phosphorus atom.

The layer (Y) included in the composite structure of the present invention may partially include the metal oxide (A) and/or the phosphorus compound (B) that is not involved in the reaction.

A reaction between the metal oxide and the phosphorus compound results in the formation of a bond represented by M—O—P in which a metal atom (M) that is a constituent of the metal oxide and a phosphorus atom (P) that is derived from the phosphorus compound are bonded via an oxygen atom (O). The peak for the binding energy of the oxygen-atom 1s orbital observed by X-ray photoelectron spectroscopy of the layer (Y) depends on the chemical structures present in the layer (Y), such as the above M—O—P bond and a M-O-M bond included in the metal oxide. The location and half width of the peak for the binding energy vary depending on the bonding state of the oxygen atoms or on the environment or structure around the oxygen atoms. As a result of a study by the present inventors, it has been found that when the peak for the binding energy of the oxygen-atom 1s orbital observed by X-ray photoelectron spectroscopy of the layer (Y) is located at 532.0 eV or higher and has a half width of less than 2.0 eV, the resultant composite structure is excellent in water vapor barrier properties, and can maintain the water vapor barrier properties at a high level over a long period of time even when used at high temperature and high humidity. In terms of obtaining the composite structure that is more excellent in water vapor barrier properties, the location of the peak for the binding energy of the oxygen-atom 1s orbital is more preferably at 532.5 eV or higher, and the half width of the peak is more preferably less than 1.7 eV.

In the layer (Y) included in the composite structure, the shape of each of the particles of the metal oxide (A) is not particularly limited, and examples of the shape may include a spherical shape, a flat shape, a polygonal shape, a fibrous shape, and a needle shape. A fibrous or needle shape is preferable in terms of providing the composite structure that is more excellent in water vapor barrier properties. The layer (Y) may contain single-shape particles alone or may contain particles having two or more different shapes. The size of the particles of the metal oxide (A) is not particularly limited either, and examples of the particles may include particles having a size of nanometer order to submicron order. The size of the particles of the metal oxide (A) as indicated by an average particle diameter is preferably in the range of 1 nm to 100 nm in terms of providing the composite structure that is more excellent in water vapor barrier properties and transparency. When the layer (Y) included in the composite structure has a fine structure as described above, the water vapor barrier properties of the composite structure are improved.

The above-described fine structure in the layer (Y) included in the composite structure can be confirmed by observing a cross-section of the layer (Y) with a transmission electron microscope (TEM). The particle diameter of each of the particles of the metal oxide (A) in the layer (Y) can be determined as an average value of a maximum length of the particle along the longest axis and a maximum length of the particle along an axis perpendicular to the longest axis, using a cross-sectional image of the layer (Y) taken by a transmission electron microscope (TEM). The above-described average diameter can be determined by averaging the particle diameters of ten particles arbitrarily selected in the cross-sectional image.

Examples of the bonding form between each of the particles of the metal oxide (A) and a phosphorus atom in the layer (Y) of the composite structure include a form in which the metal atom (M) that is a constituent of the metal oxide (A) and a phosphorus atom (P) are bonded via an oxygen atom (O). The particles of the metal oxide (A) may be bonded together via the phosphorus atom (P) derived from one molecule of the phosphorus compound (B), or may be bonded via the phosphorus atoms (P) derived from two or more molecules of the phosphorus compound (B). Specific examples of the bonding form between two particles of the metal oxide (A) bonded together include: a bonding form represented by (Mα)-O—P—O-(Mβ); a bonding form represented by (Mα)-O—P—[O—P]$_n$—O-(Mβ); a bonding form represented by (Mα)-O—P—Z—P—O-(Mβ); and a bonding form represented by (Mα)-O—P—Z—P—[O—P—Z—P]$_n$—O-(Mβ), where (Mα) represents a metal atom that is a constituent of one of the bonded particles of the metal oxide (A), and (Mβ) represents a metal atom that is a constituent of the other of the particles of the metal oxide (A). In the above examples of the bonding form, n represents an integer of 1 or more, Z represents a constituent atomic group present between two phosphorus atoms in the case where the phosphorus compound (B) has two or more phosphorus atoms per molecule, and the other substituent groups bonded to phosphorus atoms are omitted. From the standpoint of the water vapor barrier properties of the resultant composite structure, one particle of the metal oxide (A) is preferably bonded to a plurality of other particles of the metal oxide (A) in the layer (Y) included in the composite structure.

[Metal Oxide (A)]

Examples of the metal atoms that are constituents of the metal oxide (A) (the metal atoms may be collectively referred to as "metal atom (M)") include metal atoms having two or more valences (e.g., two to four valences or three to four valences). Specific examples include: Group 2 metals in the periodic table, such as magnesium and calcium; Group 12 metals in the periodic table, such as zinc; Group 13 metals in the periodic table, such as aluminum; Group 14 metals in the periodic table, such as silicon; and transition metals such as titanium and zirconium. In some cases, silicon is classified as a semimetal. In the present specification, however, silicon is categorized as a metal. The metal atom (M) that is a constituent of the metal oxide (A) may be composed of one type of atoms or may include two or more types of atoms. Among the aforementioned examples, at least one selected from the group consisting of aluminum, titanium, and zirconium is preferable as the metal atom (M) that is a constituent of the metal oxide (A), in terms of ease of handling in production of the metal oxide (A) and in terms of more excellent water vapor barrier properties of the resultant composite structure. Particularly preferred is aluminum.

The total proportion of aluminum, titanium, and zirconium in the metal atom (M) may be 60 mol % or more, 70 mol % or more, 80 mol % or more, 90 mol % or more, 95 mol % or more, or 100 mol %. The proportion of aluminum in the metal atom (M) may be 60 mol % or more, 70 mol % or more, 80 mol % or more, 90 mol % or more, 95 mol % or more, or 100 mol %.

A metal oxide produced by a method such as liquid-phase synthesis, gas-phase synthesis, or solid grinding, can be used as the metal oxide (A). In view of the production efficiency and the controllability of the shape and size of the resultant metal oxide (A), a metal oxide produced by liquid-phase synthesis is preferable.

In the case of liquid-phase synthesis, the compound (L) in which a hydrolyzable characteristic group is bonded to the metal atom (M) is used as a raw material, the compound (L) is subjected to hydrolytic condensation, and thus the metal oxide (A) can be synthesized as a hydrolytic condensate of the compound (L). In the production of the hydrolytic condensate of the compound (L) by liquid-phase synthesis, the metal oxide (A) can be produced not only by the method using the compound (L) itself as a raw material but also by methods in which any one of the following is used as a raw material and subjected to condensation or hydrolytic condensation: a partial hydrolysate of the compound (L) formed by partial hydrolysis of the compound (L); a complete hydrolysate of the compound (L) formed by complete hydrolysis of the compound (L); a partial hydrolytic condensate of the compound (L) formed by partial hydrolytic condensation of the compound (L); a condensate formed by condensation of a part of a complete hydrolysate of the compound (L); and a mixture of two or more thereof. The metal oxide (A) thus obtained is also referred to as a "hydrolytic condensate of the compound (L)" in the present specification. The type of the aforementioned hydrolyzable characteristic group (functional group) is not particularly limited. Examples thereof include halogen atoms (such as F, Cl, Br, and I), alkoxy groups, acyloxy groups, diacylmethyl groups, and nitro groups. In terms of excellent reaction controllability, halogen atoms and alkoxy groups are preferable, and alkoxy groups are more preferable.

In terms of easy reaction control and of excellent gas barrier properties of the resultant composite structure, the compound (L) preferably includes at least one compound (L$^1$) represented by the formula (I) below.

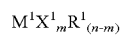
$$M^1X^1{}_mR^1{}_{(n-m)} \quad \text{(I), where:}$$

M$^1$ is a metal atom selected from the group consisting of Al, Ti, and Zr; X$^1$ is selected from the group consisting of F, Cl, Br, I, R$^2$O—, R$^3$C(=O)O—, (R$^4$C(=O))$_2$CH—, and NO$_3$; R$^1$, R$^2$, R$^3$, and R$^4$ are each selected from the group consisting of an alkyl group, an aralkyl group, an aryl group, and an alkenyl group; n is equal to a valence of M$^1$; and m represents an integer from 1 to n.

When a plurality of X$^1$ are included in the formula (I), the plurality of X$^1$ may be the same as or different from each other. When a plurality of R$^1$ are included in the formula (I), the plurality of R$^1$ may be the same as or different from each other. When a plurality of R$^2$ are included in the formula (I), the plurality of R$^2$ may be the same as or different from each other. When a plurality of R$^3$ are included in the formula (I), the plurality of R$^3$ may be the same as or different from each other. When a plurality of R$^4$ are included in the formula (I), the plurality of R$^4$ may be the same as or different from each other.

Examples of the alkyl group represented by R$^1$, R$^2$, R$^3$, and R$^4$ include a methyl group, an ethyl group, a normal-propyl group, an isopropyl group, a normal-butyl group, a s-butyl group, a t-butyl group, and a 2-ethylhexyl group. Examples of the aralkyl group represented by $R^1$, $R^2$, $R^3$, and $R^4$ include a benzyl group, a phenethyl group, and a trityl group. Examples of the aryl group represented by $R^1$, $R^2$, $R^3$, and $R^4$ include a phenyl group, a naphthyl group, a tolyl group, a xylyl group, and a mesityl group. Examples of the alkenyl group represented by $R^1$, $R^2$, $R^3$, and $R^4$ include a vinyl group and an allyl group. For example, $R^1$ is preferably an alkyl group having 1 to 10 carbon atoms, and is more preferably an alkyl group having 1 to 4 carbon atoms. $X^1$ is preferably F, Cl, Br, I, or $R^2O—$. In a preferred example of the compound ($L^1$), $X^1$ is a halogen atom (F, Cl, Br, I) or an alkoxy group ($R^2O—$) having 1 to 4 carbon atoms, and m is equal to n (the valence of $M^1$). In terms of ease of handling in production of the metal oxide (A) and in terms of more excellent water vapor barrier properties of the resultant composite structure, $M^1$ is preferably Al, Ti, or Zr, and is particularly preferably Al. In an example of the compound ($L^1$), $X^1$ is a halogen atom (F, Cl, Br, I) or an alkoxy group ($R^2O—$) having 1 to 4 carbon atoms, m is equal to n (the valence of $M^1$), and $M^1$ is Al.

Specific examples of the compound ($L^1$) include: aluminum compounds such as aluminum chloride, aluminum triethoxide, aluminum tri-normal-propoxide, aluminum triisopropoxide, aluminum tri-normal-butoxide, aluminum tri-s-butoxide, aluminum tri-t-butoxide, aluminum triacetate, aluminum acetylacetonate, and aluminum nitrate; titanium compounds such as titanium tetraisopropoxide, titanium tetra-normal-butoxide, titanium tetra(2-ethylhexoxide), titanium tetramethoxide, titanium tetraethoxide, and titanium acetylacetonate; and zirconium compounds such as zirconium tetra-normal-propoxide, zirconium tetrabutoxide, and zirconium tetraacetylacetonate. Among these, at least one compound selected from aluminum triisopropoxide and aluminum tri-s-butoxide is preferable as the compound ($L^1$). One type of compound may be used alone as the compound ($L^1$) or two or more types of compounds may be used in combination as the compound ($L^1$).

In a preferred example of the present invention, the metal atom $M^1$ included in the compound ($L^1$) is aluminum, the peak for the binding energy of the aluminum-atom 2p orbital observed by X-ray photoelectron spectroscopy of the layer (Y) is located at 74.5 eV or higher, and the peak has a half width of less than 2.0 eV. With this feature, the stability of water vapor barrier properties can be improved. In terms of obtaining the composite structure that is more excellent in the stability of water vapor barrier properties, the location of the peak for the binding energy of the aluminum-atom 2p orbital is more preferably at 75.0 eV or higher, and is even more preferably at 75.2 eV or higher. For similar reasons, the half width of the peak is more preferably less than 1.9 eV.

The proportion of the compound ($L^1$) in the compound (L) is not particularly limited as long as the effect of the present invention is obtained. For example, the proportion of other compounds than the compound ($L^1$) in the compound (L) is 20 mol % or less, 10 mol % or less, 5 mol % or less, or 0 mol %. In an example, the compound (L) consists only of the compound ($L^1$).

The other compounds than the compound ($L^1$) which are included in the compound (L) are not particularly limited as long as the effect of the present invention is obtained. Examples of the compounds include a compound in which the aforementioned hydrolyzable characteristic group is bonded to a metal atom such as magnesium, calcium, zinc, or silicon. In some cases, silicon is classified as a semimetal. In the present specification, however, silicon is categorized as a metal.

At least some of the hydrolyzable characteristic groups included in the compound (L) are substituted by hydroxyl groups as a result of hydrolysis of the compound (L). Furthermore, the hydrolysate is condensed to form a compound in which the metal atoms (M) are bonded via oxygen atoms (O). By repetitions of the condensation, a compound that can be regarded substantially as a metal oxide is formed. Usually, hydroxyl groups are present in the surface of the thus-formed metal oxide (A).

In the present specification, a compound is categorized as the metal oxide (A) when the ratio of the number of moles of oxygen atoms bonded only to the metal atoms (M) to the number of moles of the metal atoms (M) ([the number of moles of oxygen atoms bonded only to the metal atoms (M)]/ [the number of moles of the metal atoms (M)]) is 0.8 or more in the compound, where "oxygen atoms bonded only to the metal atoms (M)" include, for example, the oxygen atom (O) in the structure represented by M-O-M, and do not include, for example, oxygen atoms that are bonded to the metal atoms (M) and to hydrogen atoms (H) as is the case for the oxygen atom (O) in the structure represented by M-O—H. In the metal oxide (A), the above ratio is preferably 0.9 or more, more preferably 1.0 or more, and even more preferably 1.1 or more. The upper limit of the ratio is not particularly specified. When the valence of the metal atom (M) is denoted by n, the upper limit is usually represented by n/2.

In order for the above-described hydrolytic condensation to take place, it is important that the compound (L) have a hydrolyzable characteristic group (functional group). In the case where such a group is not bonded, hydrolytic condensation reaction does not take place or proceeds very slowly, which makes difficult the preparation of the metal oxide (A) intended.

For example, the hydrolytic condensate can be produced from a particular raw material by a technique employed in commonly-known sol-gel processes. At least one, which may be referred to as a "compound (L)-based substance" hereinafter, selected from the group consisting of the compound (L), a partial hydrolysate of the compound (L), a complete hydrolysate of the compound (L), a partial hydrolytic condensate of the compound (L), and a condensate formed by condensation of a part of a complete hydrolysate of the compound (L), can be used as the raw material. These raw materials may be produced by commonly-known methods or may be commercially-available products. For example, the raw material that can be used is, but not particularly limited to, a condensate obtained by hydrolytic condensation of about 2 to 10 molecules of the compound (L). Specifically, for example, a dimeric to decameric condensate obtained by hydrolytic condensation of aluminum triisopropoxide can be used as a part of the raw material.

The number of condensed molecules in the hydrolytic condensate of the compound (L) can be controlled by the conditions for condensation or hydrolytic condensation of the compound (L)-based substance. For example, the number of condensed molecules can be controlled by the amount of water, the type and concentration of a catalyst, and the temperature and time of the condensation or hydrolytic condensation.

As described above, the layer (Y) included in the composite structure includes the reaction product (R), and the reaction product (R) is a reaction product formed by a reaction at least between the metal oxide (A) and the phosphorus compound (B). Such a reaction product can be formed by mixing and reacting the metal oxide (A) with the phosphorus compound (B). The metal oxide (A) to be mixed with the phosphorus compound (B) (the metal oxide (A) immediately before mixing) may be the metal oxide (A) itself or may be in the form of a composition including the metal oxide (A). In a preferred example, the metal oxide (A) is mixed with the phosphorus compound (B) in the form of a liquid (a solution or a dispersion liquid) obtained by dissolving or dispersing the metal oxide (A) in a solvent.

A preferred method for producing the solution or dispersion liquid of the metal oxide (A) will be described hereinafter. Although a method for producing a dispersion liquid of the metal oxide (A) will be described using an example in which the metal oxide (A) is aluminum oxide (alumina), similar production methods can be employed for production of solutions or dispersion liquids of other metal oxides. A preferred alumina dispersion liquid can be obtained as follows: an alumina slurry is formed by subjecting an aluminum alkoxide to hydrolytic condensation in an aqueous solution whose pH has been adjusted by an acid catalyst as necessary, and then the slurry is deflocculated in the presence of a particular amount of an acid.

The temperature of the reaction system for the hydrolytic condensation of the aluminum alkoxide is not particularly limited. The temperature of the reaction system is usually in the range of 2° C. to 100° C. The liquid temperature is increased by contact between water and the aluminum alkoxide. However, there may be a case where an alcohol having a lower boiling point than water is formed as a by-product along with the progress of hydrolysis, and the alcohol is volatilized and thereby prevents the temperature of the reaction system from increasing from around the boiling point of the alcohol. In such a case, the growth of alumina may be slowed. Therefore, it is effective to remove the alcohol by heating up to around 95° C. The reaction time varies depending on the reaction conditions (the presence/absence, amount, and type of an acid catalyst). The reaction time is usually in the range of 0.01 hours to 60 hours, preferably in the range of 0.1 hours to 12 hours, and more preferably in the range of 0.1 hours to 6 hours. The reaction can be allowed to take place in an atmosphere of a gas such as air, carbon dioxide, nitrogen, and argon.

The molar amount of water used in the hydrolytic condensation is preferably 1 time to 200 times and more preferably 10 times to 100 times the molar amount of the aluminum alkoxide. The molar amount of water less than the molar amount of the aluminum alkoxide does not allow hydrolysis to proceed sufficiently, and thus is not preferable. The molar amount of water more than 200 times the molar amount of aluminum alkoxide leads to deterioration in production efficiency or increase in viscosity, and thus is not preferable. In the case where a water-containing substance (e.g., hydrochloric acid or nitric acid) is used, the amount of water used is preferably determined in view of the amount of water introduced with the substance.

As the acid catalyst used in the hydrolytic condensation, hydrochloric acid, sulfuric acid, nitric acid, p-toluenesulfonic acid, benzoic acid, acetic acid, lactic acid, butyric acid, carbonic acid, oxalic acid, maleic acid, or the like, can be used. Among these, hydrochloric acid, sulfuric acid, nitric acid, acetic acid, lactic acid, and butyric acid are preferable. More preferred are nitric acid and acetic acid. In the case where an acid catalyst is used at the time of hydrolytic condensation, the acid catalyst is preferably used in an appropriate amount depending on the type of the acid so that the pH is in the range of 2.0 to 4.0 before the hydrolytic condensation.

The alumina slurry itself obtained by the hydrolytic condensation may be used as the alumina dispersion liquid. However, when the obtained slurry is deflocculated by heating in the presence of a particular amount of an acid, a transparent alumina dispersion liquid excellent in viscosity stability can be obtained.

As the acid used at the time of deflocculation, a monovalent inorganic or organic acid such as nitric acid, hydrochloric acid, perchloric acid, formic acid, acetic acid, or propionic acid, can be used. Among these, nitric acid, hydrochloric acid, and acetic acid are preferable. More preferred are nitric acid and acetic acid.

In the case where nitric acid or hydrochloric acid is used as the acid for the deflocculation, the molar amount of the acid is preferably 0.001 times to 0.4 times and more preferably 0.005 times to 0.3 times the molar amount of aluminum atoms. When the molar amount of the acid is less than 0.001 times the molar amount of aluminum atoms, there may arise unfavorable situations, such as where the deflocculation does not proceed sufficiently or requires a very long time. When the molar amount of the acid is more than 0.4 times the molar amount of aluminum atoms, the temporal stability of the resultant alumina dispersion liquid tends to be reduced.

In the case where acetic acid is used as the acid for the deflocculation, the molar amount of the acid is preferably 0.01 times to 1.0 times and more preferably 0.05 times to 0.5 times the molar amount of aluminum atoms. When the molar amount of the acid is less than 0.01 times the molar amount of aluminum atoms, there may arise unfavorable situations, such as where the deflocculation does not proceed sufficiently or requires a very long time. When the molar amount of the acid is more than 1.0 time the molar amount of aluminum atoms, the temporal stability of the resultant alumina dispersion liquid tends to be reduced.

The acid to be present at the time of deflocculation may be added at the time of hydrolytic condensation. In the case where the acid has been lost as a result of removal of an alcohol formed as a by-product in the hydrolytic condensation, the acid is preferably added again so that the amount of the acid falls within the above range.

When the deflocculation is carried out at a temperature in the range of 40° C. to 200° C., the deflocculation can be completed in a short time with a moderate amount of the acid, and an alumina dispersion liquid containing a desired size of particles and being excellent in viscosity stability can be produced. The deflocculation temperature less than 40° C. causes the deflocculation to require a long time, and thus is not preferable. The deflocculation temperature more than 200° C. is not preferable either, since increasing the temperature beyond 200° C. requires a high-pressure resistant container or the like and is economically disadvantageous in spite of providing only a slight increase in deflocculation rate.

An alumina dispersion liquid having a predetermined concentration can be obtained by performing dilution with a solvent or performing heat concentration as necessary after the completion of the deflocculation. In the case where heat concentration is performed, the heat concentration is preferably performed at 60° C. or less under reduced pressure in order to suppress viscosity increase or gelation.

Preferably, the metal oxide (A) to be mixed with the phosphorus compound (B) (or a composition including the phosphorus compound (B) when the phosphorus compound (B) is used in the form of a composition) is substantially free from phosphorus atoms. However, for example, there may be a case where a small amount of phosphorus atoms are contained in the metal oxide (A) to be mixed with the phosphorus compound (B) (or a composition including the phosphorus compound (B) when the phosphorus compound (B) is used in the form of a composition), such as due to the influence of impurities at the time of preparation of the metal oxide (A).

Therefore, the metal oxide (A) to be mixed with the phosphorus compound (B) (or a composition including the phosphorus compound (B) when the phosphorus compound (B) is used in the form of a composition) may contain a small amount of phosphorus atoms to the extent that the effect of the present invention is not impaired. In terms of obtaining the composite structure that has more excellent water vapor barrier properties and more excellent stability of water vapor barrier properties, the content of phosphorus atoms included in the metal oxide (A) to be mixed with the phosphorus compound (B) (or a composition including the phosphorus compound (B) when the phosphorus compound (B) is used in the form of a composition) is preferably 30 mol % or less, more preferably 10 mol % or less, even more preferably 5 mol % or less, and particularly preferably 1 mol % or less and may be 0 mol %, with respect to the number of moles (defined as 100 mol %) of all the metal atoms (M) included in the metal oxide (A).

The layer (Y) included in the composite structure has a particular structure in which the particles of the metal oxide (A) are bonded together via phosphorus atoms derived from the phosphorus compound (B). The shape and size of the particles of the metal oxide (A) in the layer (Y) may be the same as or different from the shape and size of the particles of the metal oxide (A) to be mixed with the phosphorus compound (B) (or a composition including the phosphorus compound (B) when the phosphorus compound (B) is used in the form of a composition). That is, the particles of the metal oxide (A) used as a raw material of the layer (Y) may change in shape or size during the process of formation of the layer (Y). Particularly, in some cases where the layer (Y) is formed using the coating liquid (U) described later, the shape or size changes in the coating liquid (U), in the later-described liquid (S) usable for forming the coating liquid (U), or during the steps subsequent to the application of the coating liquid (U) onto the base (X).

[Phosphorus Compound (B)]

The phosphorus compound (B) contains a site capable of reacting with the metal oxide (A), and typically contains a plurality of such sites. In a preferred example, the phosphorus compound (B) contains 2 to 20 such sites (atomic groups or functional groups). Examples of such a site include a site capable of reacting with a functional group (e.g., hydroxyl group) present in the surface of the metal oxide (A). Examples of such a site include a halogen atom directly bonded to a phosphorus atom, and an oxygen atom directly bonded to a phosphorus atom. For example, a compound having a structure in which a halogen atom or an oxygen atom is directly bonded to a phosphorus atom can be used as the phosphorus compound (B). Such a halogen atom or an oxygen atom can cause a condensation reaction (hydrolytic condensation reaction) with a hydroxyl group present in the surface of the metal oxide (A). The functional group (e.g., hydroxyl group) present in the surface of the metal oxide (A) is usually bonded to the metal atom (M) that is a constituent of the metal oxide (A).

For example, a phosphorous compound having a structure in which a halogen atom or an oxygen atom is directly bonded to a phosphorus atom can be used as the phosphorus compound (B). When such a phosphorus compound (B) is used, bonding can be formed by (hydrolytic) condensation with hydroxyl groups present in the surface of the metal oxide (A). The phosphorus compound (B) may have one phosphorus atom or may have two or more phosphorus atoms.

The phosphorus compound (B) may be at least one compound selected from the group consisting of phosphoric acid, polyphosphoric acid, phosphorous acid, phosphonic acid, and derivatives thereof. Specific examples of the polyphosphoric acid include pyrophosphoric acid, triphosphoric acid, and polyphosphoric acid resulting from condensation of four or more phosphoric acid molecules. Examples of the derivatives include salts, (partial) esters, halides (chlorides etc.), and dehydration products (diphosphorus pentoxide etc.), of phosphoric acid, polyphosphoric acid, phosphorous acid, and phosphonic acid. In addition, examples of the derivatives of phosphonic acid include: compounds (e.g., nitrilotris(methylenephosphonic acid) and N,N,N',N'-ethylenediaminetetrakis(methylenephosphonic acid)) in which a hydrogen atom directly bonded to a phosphorus atom of phosphonic acid ($H-P(=O)(OH)_2$) is substituted by an alkyl group that may have various types of functional groups; and salts, (partial) esters, halides, and dehydration products of such compounds. Furthermore, an organic polymer having phosphorus atoms, such as phosphorylated starch, can also be used as the phosphorus compound (B). One of these phosphorus compounds (B) may be used alone or two or more thereof may be used in combination. Among these phosphorus compounds (B), phosphoric acid is preferably used alone or in combination with another phosphorus compound, in terms of more excellent stability of the later-described coating liquid (U) used for formation of the layer (Y) and in terms of more excellent water vapor barrier properties of the resultant composite structure.

As described above, the layer (Y) included in the composite structure includes the reaction product (R), and the reaction product (R) is a reaction product formed by a reaction at least between the metal oxide (A) and the phosphorus compound (B). Such a reaction product can be formed by mixing and reacting the metal oxide (A) with the phosphorus compound (B). The phosphorus compound (B) to be mixed with the metal oxide (A) (the phosphorus compound (B) immediately before mixing) may be the phosphorus compound (B) itself or may be in the form of a composition including the phosphorus compound (B), and is preferably in the form of a composition including the phosphorus compound (B). In a preferred example, the phosphorus compound (B) is mixed with the metal oxide (A) in the form of a solution obtained by dissolving the phosphorus compound (B) in a solvent. The solvent used can be any type of solvent. Examples of a preferred solvent include water and a mixed solvent containing water.

In terms of obtaining the composite structure that has more excellent water vapor barrier properties and more excellent stability of water vapor barrier properties, the content of metal atoms in the phosphorus compound (B) or a composition including the phosphorus compound (B) which is to be mixed with the metal oxide (A) is preferably reduced. The content of metal atoms in the phosphorus compound (B) or a composition including the phosphorus compound (B) which is to be mixed with the metal oxide (A) is preferably 100 mol % or less, more preferably 30 mol % or less, even more preferably 5 mol % or less, and particularly preferably 1 mol % or less and may be 0 mol %, with respect to the number of moles (defined as 100 mol %) of all the phosphorus atoms included in the phosphorus compound (B) or the composition including the phosphorus compound (B).

[Reaction Product (R)]

Examples of the reaction product (R) include a reaction product formed by a reaction only between the metal oxide (A) and the phosphorus compound (B). Examples of the reaction product (R) include also a reaction product formed by a reaction of the metal oxide (A), the phosphorus compound (B), and another compound. The reaction product (R) can be formed by a technique described for the later-described production method.

[Ratio Between Metal Oxide (A) and Phosphorus Compound (B)]

In the layer (Y), the number of moles $N_M$ of metal atoms that are constituents of the metal oxide (A) and the number of moles $N_P$ of phosphorus atoms derived from the phosphorus compound (B) preferably satisfy a relation of 1.0≤(the number of moles $N_M$)/(the number of moles $N_P$)≤3.6, and more preferably satisfy a relation of 1.1≤(the number of moles $N_M$)/(the number of moles $N_P$)≤3.0. In the case where the value of (the number of moles $N_M$)/(the number of moles $N_P$) is more than 3.6, the metal oxide (A) is excessive relative to the phosphorus compound (B). In this case, the bonding between the particles of the metal oxide (A) is insufficient, and the amount of hydroxyl groups present in the surface of the metal oxide (A) is large. Consequently, the water vapor barrier properties and the stability of water vapor barrier properties tend to be deteriorated. On the other hand, in the case where the value of (the number of moles $N_M$)/(the number of moles $N_P$) is less than 1.0, the phosphorus compound (B) is excessive relative to the metal oxide (A). In this case, an excess amount of the phosphorus compound (B) that does not participate in the bonding with the metal oxide (A) is large, and the amount of hydroxyl groups derived from the phosphorus compound (B) is likely to be large. Consequently, the water vapor barrier properties and the stability of water vapor barrier properties tend to be deteriorated.

The above ratio can be adjusted by the ratio between the amount of the metal oxide (A) and the amount of the phosphorus compound (B) in the coating liquid for forming the layer (Y). The ratio between the number of moles $N_M$ and the number of moles $N_P$ in the layer (Y) is usually a ratio in the coating liquid, and is the same as the ratio between the number of moles of the metal atoms that are constituents of the metal oxide (A) and the number of moles of the phosphorus atoms that are constituents of the phosphorus compound (B).

[Polymer (C)]

The layer (Y) may further include a particular polymer (C). The polymer (C) is a polymer having at least one functional group (f) selected from the group consisting of a hydroxyl group, a carboxyl group, a carboxylic acid anhydride group, and a salt of a carboxyl group. In the layer (Y) included in the composite structure, the polymer (C) may be directly or indirectly bonded to either or both the particles of the metal oxide (A) and the phosphorus atoms derived from the phosphorus compound (B) through the functional group (f) of the polymer (C). In the layer (Y) included in the composite structure, the reaction product (R) may have a polymer (C)-derived portion resulting, for example, from a reaction of the polymer (C) with the metal oxide (A) or the phosphorus compound (B). In the present specification, a polymer meeting the requirements for the phosphorus compound (B) and including the functional group (f) is not categorized as the polymer (C), but is regarded as the phosphorus compound (B).

A polymer including a constitutional unit having the functional group (f) can be used as the polymer (C). Specific examples of such a constitutional unit include constitutional units having one or more functional groups (f), such as a vinyl alcohol unit, an acrylic acid unit, a methacrylic acid unit, a maleic acid unit, an itaconic acid unit, a maleic anhydride unit, and a phthalic anhydride unit. The polymer (C) may include only one type of constitutional unit having the functional group (f) or may include two or more types of constitutional units having the functional group (f).

In order to obtain the composite structure that has more excellent water vapor barrier properties and stability of water vapor barrier properties, the proportion of the constitutional unit having the functional group (f) in all the constitutional units of the polymer (C) is preferably 10 mol % or more, more preferably 20 mol % or more, even more preferably 40 mol % or more, and particularly preferably 70 mol % or more, and may be 100 mol %.

When the polymer (C) is constituted by the constitutional unit having the functional group (f) and other constitutional units, the type of the other constitutional units is not particularly limited. Examples of the other constitutional units include: constitutional units derived from (meth)acrylic acid esters, such as a methyl acrylate unit, a methyl methacrylate unit, an ethyl acrylate unit, an ethyl methacrylate unit, a butyl acrylate unit, and a butyl methacrylate unit; constitutional units derived from vinyl esters, such as a vinyl formate unit and a vinyl acetate unit; constitutional units derived from aromatic vinyl, such as a styrene unit and a p-styrenesulfonic acid unit; and constitutional units derived from olefins, such as an ethylene unit, a propylene unit, and an isobutylene unit. When the polymer (C) includes two or more types of constitutional units, the polymer (C) may be any of an alternating copolymer, a random copolymer, a block copolymer, and a tapered copolymer.

Specific examples of the polymer (C) that has a hydroxyl group include polyvinyl alcohol, partially-saponified polyvinyl acetate, polyethylene glycol, polyhydroxyethyl(meth)acrylate, polysaccharides such as starch, and polysaccharide derivatives derived from polysaccharides. Specific examples of the polymer (C) that has a carboxyl group, a carboxylic acid anhydride group, or a salt of a carboxyl group include polyacrylic acid, polymethacrylic acid, poly(acrylic acid/methacrylic acid), and salts thereof. Specific examples of the polymer (C) that has a constitutional unit free from the functional group (f) include ethylene-vinyl alcohol copolymer, ethylene-maleic anhydride copolymer, styrene-maleic anhydride copolymer, isobutylene-maleic anhydride alternating copolymer, ethylene-acrylic acid copolymer, and saponified ethylene-ethyl acrylate copolymer. In order to obtain the composite structure that has more excellent water vapor barrier properties and stability of water vapor barrier properties, the polymer (C) is preferably at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

The molecular weight of the polymer (C) is not particularly limited. In order to obtain the composite structure that has more excellent water vapor barrier properties and mechanical characteristics (drop impact resistance etc.), the number average molecular weight of the polymer (C) is preferably 5,000 or more, more preferably 8,000 or more, and even more preferably 10,000 or more. The upper limit of the number average molecular weight of the polymer (C) is not particularly specified, and is, for example, 1,500,000 or less.

In order to further improve the water vapor barrier properties, the content of the polymer (C) in the layer (Y) is preferably 50 mass % or less, more preferably 40 mass % or less, and even more preferably 30 mass % or less and may be 20 mass % or less, with respect to the mass of the layer (Y) (defined as 100 mass %). The polymer (C) may or may not react with another constituent in the layer (Y). In the present specification, the polymer (C) having reacted with another constituent is also referred to as a polymer (C). For example, in the case where the polymer (C) is bonded to the metal oxide (A) and/or a phosphorus atom derived from the phosphorus compound (B), the reaction product is also referred to as a polymer (C). In this case, the above-described content of the polymer (C) is calculated by dividing the mass of the polymer (C) yet to be bonded to the metal oxide (A) and/or a phosphorus atom by the mass of the layer (Y).

The layer (Y) included in the composite structure may consist only of the reaction product (R) (including a reaction product having a polymer (C)-derived portion) formed by a reaction at least between the metal oxide (A) and the phosphorus compound (B), may consist only of the reaction product (R) and the unreacted polymer (C), or may further include other substances.

Examples of the other substances include: inorganic acid metal salts such as metal carbonates, metal hydrochlorides, metal nitrates, metal hydrogen carbonates, metal sulfates, metal hydrogen sulfates, metal borates, and metal aluminates; organic acid metal salts such as metal oxalates, metal acetates, metal tartrates, and metal stearates; metal complexes such as metal acetylacetonate complexes (aluminum acetylacetonate etc.), cyclopentadienyl metal complexes (titanocene etc.), and cyanometal complexes; layered clay compounds; crosslinking agents; polymer compounds other than the polymer (C); plasticizers; antioxidants; ultraviolet absorbers; and flame retardants.

The content of the other substances in the layer (Y) in the composite structure is preferably 50 mass % or less, more preferably 20 mass % or less, even more preferably 10 mass % or less, and particularly preferably 5 mass % or less, and may be 0 mass % (free from the other substances).

[Thickness of Layer (Y)]

The thickness of the layer (Y) included in the composite structure of the present invention (or the total thickness of layers (Y) when the composite structure includes two or more layers (Y)) is preferably 4.0 µm or less, more preferably 2.0 µm or less, even more preferably 1.0 µm or less, and particularly preferably 0.9 µm or less. When the layer (Y) is thin, the dimensional change of the composite structure during a process such as printing and lamination can be kept small, the flexibility of the composite structure is increased, and the mechanical characteristics of the composite structure can be made close to the mechanical characteristics of the base itself.

Even in the case where the total thickness of the layer(s) (Y) is 1.0 µm or less (e.g., 0.5 µm or less), the composite structure of the present invention can have a moisture permeability of 5 g/(m²·day) or less under conditions of 85° C. and 85/0% RH. Here, "85/0% RH" means that the relative humidity on one side of the composite structure is 85% and the relative humidity on the other side is 0%. The thickness of the layer (Y) (or the total thickness of layers (Y) when the composite structure includes two or more layers (Y)) is preferably 0.1 µm or more (e.g., 0.2 µm or more). From the standpoint of better water vapor barrier properties of the composite structure of the present invention, the thickness of a single layer (Y) is preferably 0.05 µm or more (e.g., 0.15 µm or more). The thickness of the layer (Y) can be controlled by the concentration of the later-described coating liquid (U) used for formation of the layer (Y) or by the method for application of the coating liquid (U).

[Base (X)]

The material of the base (X) included in the composite structure of the present invention is not particularly limited, and a base made of any of various materials can be used. Examples of the material of the base (X) include: resins such as thermoplastic resins and thermosetting resins; fiber assemblies such as fabric and paper; wood; glass; metals; and metal oxides. The base may have a composite configuration made of a plurality of materials or may have a multi-layer configuration.

The form of the base (X) is not particularly limited. The base (X) may be a layer-shaped base such as a film or a sheet, or may be any of various formed bodies having a three-dimensional shape such as a spherical shape, a polygonal shape, or a pipe shape. Among these, a layer-shaped base is useful particularly when the composite structure (layered structure) is used, for example, as a packaging material for packaging foods etc. or as a solar cell component.

Examples of the layer-shaped base include a single-layer or multi-layer base including at least one layer selected from the group consisting of a thermoplastic resin film layer, a thermosetting resin film layer, a fiber assembly sheet layer (a fabric layer, paper layer, or the like), a wood sheet layer, a glass layer, an inorganic deposited layer, and a metal foil layer. Among these, a base including at least one layer selected from the group consisting of a thermoplastic resin film layer, a paper layer, and an inorganic deposited layer is preferable. Such a base may be a single-layer base or a multi-layer base. The composite structure (layered structure) that uses such a base is excellent in processability into a packaging material and various characteristics required for use as a packaging material.

Examples of the thermoplastic resin film for forming the thermoplastic resin film layer may include films obtained by subjecting the following thermoplastic resins to forming processes: polyolefin resins such as polyethylene and polypropylene; polyester resins such as polyethylene terephthalate, polyethylene-2,6-naphthalate, polybutylene terephthalate, and copolymers thereof, polyamide resins such as nylon-6, nylon-66, and nylon-12; hydroxyl group-containing polymers such as polyvinyl alcohol and ethylene-vinyl alcohol copolymer; polystyrene; poly(meth)acrylic acid ester; polyacrylonitrile; polyvinyl acetate; polycarbonate; polyarylate; regenerated cellulose; polyimide; polyetherimide; polysulfone; polyethersulfone; polyetheretherketone; and ionomer resins. As the base of the layered body used as a packaging material for packaging foods etc., a film made of polyethylene, polypropylene, polyethylene terephthalate, nylon-6, or nylon-66 is preferable. For uses other than use in a packaging material, polymethyl(meth)acrylate, methyl(meth)acrylate/styrene copolymer, syndiotactic polystyrene, cyclic polyolefin, cyclic olefin copolymer, polyacetylcellulose, polyethylene naphthalate, polyvinyl acetal, polyvinyl butyral, polyvinyl chloride, polymethylpentene and the like, are also preferable as well as the above-mentioned thermoplastic resins for forming the thermoplastic film layer.

The thermoplastic resin film may be an oriented film or a non-oriented film. In terms of excellent suitability for processes (such as printing and lamination) of the resultant composite structure, an oriented film, particularly a biaxially-oriented film, is preferable. The biaxially-oriented film may be a biaxially-oriented film produced by any of a simultaneous biaxial orientation method, a sequential biaxial orientation method, and a tubular orientation method.

Examples of the paper used in the paper layer include kraft paper, high-quality paper, simili paper, glassine paper, parchment paper, synthetic paper, white paperboard, manila board, milk carton board, cup paper, and ivory paper. A layered structure for a paper container can be obtained by use of the base that includes the paper layer.

The inorganic deposited layer is preferably one having barrier properties against oxygen gas and water vapor. A layer having transparency or a layer having light shielding properties as typified by a deposited layer of metal such as aluminum can be used as the inorganic deposited layer as appropriate. The inorganic deposited layer can be formed by vapor-depositing an inorganic substance onto a substrate, and the whole layered body including the substrate and the inorganic deposited layer formed on the substrate can be used as the base (X) that has a multi-layer configuration. Examples of an inorganic deposited layer having transparency include: a layer formed of an inorganic oxide such as aluminum oxide, silicon oxide, silicon oxynitride, magnesium oxide, tin oxide, or a mixture thereof, a layer formed of an inorganic nitride such as silicon nitride or silicon carbonitride; and a layer formed of an inorganic carbide such as silicon carbide. Among these, a layer formed of aluminum oxide, silicon oxide, magnesium oxide, or silicon nitride is preferable from the standpoint of excellent barrier properties against oxygen gas and water vapor.

The preferred thickness of the inorganic deposited layer varies depending on the types of the constituents of the inorganic deposited layer, but is usually in the range of 2 nm to 500 nm. A thickness that allows good barrier properties and mechanical properties of the composite structure may be selected within the range. When the thickness of the inorganic deposited layer is less than 2 nm, there is a tendency that the repeatability of exhibition of the barrier properties of the inorganic deposited layer against oxygen gas and water vapor is reduced, and there may also be a case where the inorganic deposited layer does not exhibit sufficient barrier properties. When the thickness of the inorganic deposited layer is more than 500 nm, there is a tendency that the barrier properties of the inorganic deposited layer are likely to be deteriorated as a result of the composite structure being pulled or bent. The thickness of the inorganic deposited layer is more preferably in the range of 5 nm to 200 nm, and even more preferably in the range of 10 nm to 100 nm.

Examples of the method for forming the inorganic deposited layer may include vacuum deposition, sputtering, ion plating, and chemical vapor deposition (CVD). Among these, vacuum deposition is preferable from the standpoint of productivity. A heating technique used for vacuum deposition is preferably any of an electron beam heating technique, a resistive heating technique, and an induction heating technique. In order to improve the denseness of the inorganic deposited layer and the adhesiveness to the substrate on which the inorganic deposited layer is formed, the deposition may be performed by employing plasma-assisted deposition or ion beam-assisted deposition. In order to increase the transparency of the inorganic deposited layer, reactive deposition in which a reaction is caused by blowing oxygen gas or the like may be employed for the deposition.

In the case where the base (X) is in the form of a layer, the thickness of the base (X) is preferably in the range of 1 μm to 200 μm, more preferably in the range of 5 μm to 100 μm, and even more preferably in the range of 7 μm to 60 μm, from the standpoint of good mechanical strength and processability of the resultant composite structure.

[Adhesive Layer (H)]

In the composite structure of the present invention, the layer (Y) may be stacked in direct contact with the base (X). Alternatively, the layer (Y) may be stacked on the base (X) with an adhesive layer (H) interposed between the base (X) and the layer (Y). With this configuration, the adhesion between the base (X) and the layer (Y) can be enhanced in some cases. The adhesive layer (H) may be formed of an adhesive resin. The adhesive layer (H) made of an adhesive resin can be formed by treating the surface of the base (X) with a commonly-known anchor coating agent or by applying a commonly-known adhesive agent onto the surface of the base (X). As the adhesive agent, a two-component reactive polyurethane adhesive agent prepared by mixing and reacting a polyisocyanate component and a polyol component is preferable. There may be a case where the adhesion can be further enhanced by adding a small amount of additive such as a commonly-known silane coupling agent into the anchor coating agent or the adhesive agent. Suitable examples of the silane coupling agent include a silane coupling agent having a reactive group such as an isocyanate group, an epoxy group, an amino group, a ureido group, or a mercapto group. Strong adhesion between the base (X) and the layer (Y) via the adhesive layer (H) makes it possible to more effectively suppress deterioration of the water vapor barrier properties and appearance of the composite structure of the present invention when the composite structure is subjected to a process such as printing or lamination.

Increasing the thickness of the adhesive layer (H) can enhance the strength of the composite structure of the present invention. However, when the adhesive layer (H) is too thick, the appearance tends to be deteriorated. The thickness of the adhesive layer (H) is preferably in the range of 0.03 μm to 0.18 μm. With this configuration, deterioration of the water vapor barrier properties and appearance of the composite structure of the present invention can be suppressed more effectively when the composite structure is subjected to a process such as printing or lamination. Furthermore, the drop impact resistance of a packaging material using the composite structure of the present invention can be enhanced. The thickness of the adhesive layer (H) is more preferably in the range of 0.04 μm to 0.14 μm, and even more preferably in the range of 0.05 μm to 0.10 μm.

[Configuration of Composite Structure]

The composite structure (layered body) of the present invention may consist only of the base (X) and the layer (Y) or may consist only of the base (X), the layer (Y), and the adhesive layer (H). The composite structure of the present invention may include a plurality of layers (Y). The composite structure of the present invention may further include another member (e.g., another layer such as a thermoplastic resin film layer, a paper layer, or an inorganic deposited layer) other than the base (X), the layer (Y), and the adhesive layer (H). The composite structure of the present invention that has such another member (another layer or the like) can be produced by stacking the layer (Y) onto the base (X) directly or with the adhesive layer (H) interposed therebetween, and then by forming or adhering the other member (another layer or the like) onto the laminate directly or with an adhesive layer interposed therebetween. By having such another member (another layer or the like) included in the composite structure, the characteristics of the composite structure can be improved or additional characteristics can be imparted to the composite structure. For example, heat-sealing properties can be imparted to the composite structure of the present invention, or the barrier properties or mechanical properties can be further improved.

In particular, by forming a layer of a polyolefin as the outermost layer of the composite structure of the present invention, heat-sealing properties can be imparted to the composite structure, or the mechanical characteristics of the composite structure can be improved. From the standpoint of, for example, heat-sealing properties or improvement in mechanical characteristics, the polyolefin is preferably polypropylene or polyethylene. In addition, in order to improve the mechanical characteristics of the composite structure, at least one film selected from the group consisting of a film made of a polyester, a film made of a polyamide, and a film made of a hydroxyl group-containing polymer is preferably stacked as another layer. From the standpoint of improvement in mechanical characteristics, polyethylene terephthalate (PET) is preferable as the polyester, nylon-6 is preferable as the polyamide, and ethylene-vinyl alcohol copolymer is preferable as the hydroxyl group-containing polymer. Between the layers, an anchor coat layer or a layer made of an adhesive agent may be provided as necessary.

In particular, it has been surprisingly discovered that when the composite structure of the present invention includes a plurality of layers (Y), the water vapor barrier properties are considerably improved. Such a composite structure can be obtained by stacking together a plurality of layered bodies each including the base (X) and the layer (Y) stacked on the base (X) or also by stacking the layer (Y) onto both surfaces of the base (X). The latter is desirable from the standpoint of economic efficiency.

The composite structure of the present invention may include a surface protective layer disposed on one or both surfaces of the composite structure. A layer made of a scratch-resistant resin is preferable as the surface protective layer. The surface protective layer of a device such as a solar cell which may be used outdoors is preferably made of a resin having high weather resistance (e.g., light resistance). In the case of protecting a surface through which light needs to be transmitted, the surface protective layer preferably has high light transmissivity. Examples of the material of the surface protective layer (surface protective film) include acrylic resin, polycarbonate, polyethylene terephthalate, polyethylene naphthalate, ethylene-tetrafluoroethylene copolymer, polytetrafluoroethylene, tetrafluoroethylene-perchloroalkoxy copolymer, tetrafluoroethylene-hexafluoropropylene copolymer, difluoroethylene-tetrafluoroethylene copolymer, polychlorotrifluoroethylene, polyvinylidene fluoride, and polyvinyl fluoride. In an example, the composite structure includes an acrylic resin layer disposed on one surface thereof. Any of various additives (e.g., an ultraviolet absorber) may be added to the surface protective layer in order to enhance the durability of the surface protective layer. A preferred example of the surface protective layer that has high weather resistance is an acrylic resin layer having an ultraviolet absorber added thereto. Examples of the ultraviolet absorber include commonly-known ultraviolet absorbers, and specifically include benzotriazole-based, benzophenone-based, salicylate-based, cyanoacrylate-based, nickel-based, and triazine-based ultraviolet absorbers. Furthermore, a stabilizer, a light stabilizer, an antioxidant, or the like, may be additionally used.

The surface protective layer is stacked on a layered film (which may be referred to as a "water vapor barrier film" hereinafter) of the base and the water vapor barrier layer. The method for stacking the surface protective layer on the water vapor barrier film is not limited. For example, the surface protective layer and the water vapor barrier film may be adhered together using an adhesive layer. The adhesive layer can be selected depending on the type of the surface protective layer. For example, in the case where the surface protective layer is an acrylic resin film, polyvinyl acetal (e.g., polyvinyl butyral) may be used for the adhesive layer. In this case, the water vapor barrier film and the surface protective layer can be thermally-laminated with the adhesive layer interposed therebetween.

The composite structure of the present invention can be formed also by stacking together at least one layer (Y) and at least another layer (including the base). Examples of the other layer include a polyester layer, a polyamide layer, a polyolefin layer (which may be a pigment-containing polyolefin layer, a heat-resistant polyolefin layer, or a biaxially-oriented heat-resistant polyolefin layer), a hydroxyl group-containing polymer layer (e.g., an ethylene-vinyl alcohol copolymer layer), a paper layer, an inorganic deposited film layer, a thermoplastic elastomer layer, and an adhesive layer. The number of these other layers, the number of the layers (Y), and the stacking order are not particularly limited as long as the composite structure includes the base and the layer (Y). The other layers may each be replaced by a formed body (formed body having a three-dimensional shape) that is made of the same material as the layer.

Specific examples of the configuration of the composite structure of the present invention are listed below. In the specific examples listed below, each of the layers may be replaced by a formed body (formed body having a three-dimensional shape) that is made of the same material as the layer. Although the composite structure may have an adhesive layer as exemplified by the adhesive layer (H), such an adhesive layer is omitted for the specific examples listed below.

(1) Layer (Y)/polyester layer,
(2) Layer (Y)/polyester layer/layer (Y),
(3) Layer (Y)/polyamide layer,
(4) Layer (Y)/polyamide layer/layer (Y),
(5) Layer (Y)/polyolefin layer,
(6) Layer (Y)/polyolefin layer/layer (Y),
(7) Layer (Y)/hydroxyl group-containing polymer layer,
(8) Layer (Y)/hydroxyl group-containing polymer layer/layer (Y),
(9) Layer (Y)/paper layer,
(10) Layer (Y)/paper layer/layer (Y),
(11) Layer (Y)/inorganic deposited layer/polyester layer,
(12) Layer (Y)/inorganic deposited layer/polyamide layer,
(13) Layer (Y)/inorganic deposited layer/polyolefin layer,
(14) Layer (Y)/inorganic deposited layer/hydroxyl group-containing polymer layer,
(15) Layer (Y)/polyester layer/polyamide layer/polyolefin layer,
(16) Layer (Y)/polyester layer/layer (Y)/polyamide layer/polyolefin layer,
(17) Polyester layer/layer (Y)/polyamide layer/polyolefin layer,
(18) Layer (Y)/polyamide layer/polyester layer/polyolefin layer,
(19) Layer (Y)/polyamide layer/layer (Y)/polyester layer/polyolefin layer,
(20) Polyamide layer/layer (Y)/polyester layer/polyolefin layer,
(21) Layer (Y)/polyolefin layer/polyamide layer/polyolefin layer,
(22) Layer (Y)/polyolefin layer/layer (Y)/polyamide layer/polyolefin layer,
(23) Polyolefin layer/layer (Y)/polyamide layer/polyolefin layer,
(24) Layer (Y)/polyolefin layer/polyolefin layer,
(25) Layer (Y)/polyolefin layer/layer (Y)/polyolefin layer,
(26) Polyolefin layer/layer (Y)/polyolefin layer,
(27) Layer (Y)/polyester layer/polyolefin layer,
(28) Layer (Y)/polyester layer/layer (Y)/polyolefin layer,
(29) Polyester layer/layer (Y)/polyolefin layer,
(30) Layer (Y)/polyamide layer/polyolefin layer,
(31) Layer (Y)/polyamide layer/layer (Y)/polyolefin layer,
(32) Polyamide layer/layer (Y)/polyolefin layer,
(33) Layer (Y)/polyester layer/paper layer,
(34) Layer (Y)/polyamide layer/paper layer,
(35) Layer (Y)/polyolefin layer/paper layer,
(36) Polyolefin layer/paper layer/polyolefin layer/layer (Y)/polyester layer/polyolefin layer,
(37) Polyolefin layer/paper layer/polyolefin layer/layer (Y)/polyamide layer/polyolefin layer,

(38) Polyolefin layer/paper layer/polyolefin layer/layer (Y)/polyolefin layer,
(39) Paper layer/polyolefin layer/layer (Y)/polyester layer/polyolefin layer,
(40) Polyolefin layer/paper layer/layer (Y)/polyolefin layer,
(41) Paper layer/layer (Y)/polyester layer/polyolefin layer,
(42) Paper layer/layer (Y)/polyolefin layer,
(43) Layer (Y)/paper layer/polyolefin layer,
(44) Layer (Y)/polyester layer/paper layer/polyolefin layer,
(45) Polyolefin layer/paper layer/polyolefin layer/layer (Y)/polyolefin layer/hydroxyl group-containing polymer layer,
(46) Polyolefin layer/paper layer/polyolefin layer/layer (Y)/polyolefin layer/polyamide layer,
(47) Polyolefin layer/paper layer/polyolefin layer/layer (Y)/polyolefin layer/polyester layer.

According to the present invention, a composite structure that possesses one, two, or all of the features listed below can be obtained. In a preferred example, the composite structure in which the thickness of the layer (Y) (or the total thickness of layers (Y) when the composite structure includes two or more layers (Y)) is 1.0 μm or less (e.g., 0.5 μm or more and 1.0 μm or less) possesses at least one of the features listed below. The details of the conditions for moisture permeability measurement will be described in EXAMPLES.

(Feature 1) When the moisture permeability is measured under conditions of 85° C. and 85/0% RH continuously for 100 hours, an average moisture permeability during the period from 0 to 100 hours (from the start of the measurement to 100 hours) is 5 $g/(m^2 \cdot day)$ or less.

(Feature 2) When the moisture permeability is measured under conditions of 85° C. and 85/0% RH continuously for 2000 hours, an average moisture permeability during the period from 1900 to 2000 hours is 5 $g/(m^2 \cdot day)$ or less.

(Feature 3) The moisture permeability is 0.1 $g/(m^2 \cdot day)$ or less under conditions of 40° C. and 90/0% RH.

[Uses]

The composite structure of the present invention is excellent in water vapor barrier properties and in the stability of water vapor barrier properties, and can maintain the water vapor barrier properties at a high level over a long period of time even when used at high temperature and high humidity. In addition, according to the present invention, a composite structure excellent in appearance can be obtained. Therefore, the composite structure of the present invention can be applied to various uses. For example, the product of the present invention may be a product including the composite structure of the present invention, the composite structure being used as a packaging material, a solar cell component, or a display device component.

The composite structure of the present invention is particularly preferably used as a packaging material. Examples of uses other than use as a packaging material include uses as the following: an electronic device-related film such as a substrate film for LCDs, a substrate film for organic EL devices, a substrate film for electronic paper, a sealing film for electronic devices, a film for PDPs, a film for LEDs, a film for IC tags, a back sheet for solar cells, and a protective film for solar cells; a member for optical communication; a flexible film for electronic equipment; a barrier membrane for fuel cells; a sealing film for fuel cells; and a substrate film for various functional films.

The composite structure of the present invention can be used as an alternative to glass for protecting the surface of a solar cell. That is, the use of the composite structure of the present invention makes it possible to avoid using a thick glass substrate having substantially no flexibility. However, the composite structure of the present invention may be used in a solar cell that includes a thick glass substrate.

A solar cell of the present invention can be obtained by fixing a protective film of the present invention to a predetermined surface of a solar cell. The method for fixing the protective film is not particularly limited. The protective film may be fixed by a commonly-known method, and may be fixed (adhered) using, for example, an adhesive layer such as an OCA (OPTICAL CLEAR ADHESIVE). Specifically, layer stacking may be performed using a separate adhesive layer from the protective film or using a protective film that includes an adhesive layer. The adhesive layer is not particularly limited. A commonly-known adhesive layer or the above-described adhesive layer may be used. Examples of the adhesive layer include a film functioning as an adhesive layer.

The solar cell for which the composite layered body of the present invention is used is not particularly limited. Examples of the solar cell include a silicon solar cell, a compound semiconductor solar cell, and an organic solar cell. Examples of the silicon solar cell include a monocrystalline silicon solar cell, a polycrystalline silicon solar cell, and an amorphous silicon solar cell. Examples of the compound semiconductor solar cell include a group III-V compound semiconductor solar cell, a group II-VI compound semiconductor solar cell, and a group I-III-VI compound semiconductor solar cell. The solar cell may or may not be an integrated solar cell having a plurality of unit cells connected in series.

The packaging material can be applied to various uses, and is preferable for uses in which barrier properties against oxygen or water vapor are required and for uses in which the air inside the packaging material is replaced by any of various functional gases. For example, the packaging material of the present invention is used preferably as a food packaging material (in particular, a packaging material for retort foods). When used as a packaging material for retort foods, the packaging material of the present invention is suitably used particularly in a form having a fold line, such as in the form of a stand-up pouch. In addition, the packaging material of the present invention can be used preferably not only as a food packaging material but also as a packaging material for packaging chemicals such as agrochemicals and pharmaceuticals, medical devices, industrial materials such as machinery components and delicate materials, and garments.

In addition, the packaging material of the present invention can be used by being processed into any of various formed products. Such a formed product may be a vertical form fill seal pouch, a vacuum packaging pouch, a spout pouch, a laminated tube container, an infusion bag, a container cover, a paper container, or a vacuum insulator. The formed product of the present invention may also be a formed product other than a vacuum insulator.

Heat sealing is performed for the above formed product (e.g., a vertical form fill seal pouch or the like). In the case where heat sealing is performed, it is usually necessary to dispose a heat-sealable layer on a side corresponding to the inner side of the formed product or on both sides corresponding to the inner side and outer side of the formed product. When the heat-sealable layer is provided only on a side corresponding to the inner side of the formed product (pouch), the body portion of the formed product is usually sealed with a fin seal. When the heat-sealable layer is provided on both sides corresponding to the inner side and outer side of the formed product, the body portion is usually sealed with a lap seal. A polyolefin layer (which may be referred to as a "PO layer" hereinafter) is preferable as the heat-sealable layer.

For example, the formed product including the composite structure of the present invention may be a vertical form fill seal pouch for packaging foods or beverages in the form of liquid, viscous body, solid block, or mixture thereof. The vertical form fill seal pouch including the composite structure of the present invention is excellent in gas barrier properties and water vapor barrier properties, and maintains its barrier properties even under severe temperature and humidity conditions. Therefore, with the vertical form fill seal pouch, quality degradation of the packaged article can be suppressed over a long period of time.

Hereinafter, a multi-layer film including the base (X) and the layer (Y) stacked on the base (X) may be referred to as a multi-layer barrier film. This multi-layer barrier film is also one type of the composite structure of the present invention. Layers for imparting various characteristics (e.g., heat sealing properties) may be stacked on the multi-layer barrier film. For example, the composite structure of the present invention may have a configuration of multi-layer barrier film/adhesive layer/polyolefin layer or a configuration of polyolefin layer/adhesive layer/multi-layer barrier film/adhesive layer/polyolefin layer. That is, the composite structure of the present invention may include a polyolefin layer disposed on one of the outermost surfaces. In addition, the composite structure of the present invention may include a first polyolefin layer disposed on one of the outermost surfaces and a second polyolefin layer disposed on the other outermost surface. The first polyolefin layer and the second polyolefin layer may be the same or different.

The vertical form fill seal pouch may be formed by stacking together at least one multi-layer barrier film and at least another layer. Examples of the other layer include a polyester layer, a polyamide layer, a polyolefin layer, a paper layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a vertical form fill seal pouch include a configuration of multi-layer barrier film/polyamide layer/PO layer, a configuration of multi-layer barrier film/PO layer, and a configuration of PO layer/multi-layer barrier film/PO layer. In these configurations, for example, a polyamide film can be used as the base of the multi-layer barrier film. The vertical form fill seal pouch maintains its barrier properties even under severe temperature and humidity conditions. Adhesive layers may be provided between the layers constituting the vertical form fill seal pouch. In the case where the layer (Y) of the composite structure of the present invention lies on one surface of the base, the layer (Y) may face either outwardly or inwardly of the vertical form fill seal pouch.

The formed product including the composite structure of the present invention may be a vacuum packaging pouch for packaging solid-containing foods etc. The vacuum packaging pouch is excellent in gas barrier properties and water vapor barrier properties, and maintains its barrier properties even under severe temperature and humidity conditions. Therefore, in the vacuum packaging pouch, there is little deterioration of the barrier properties over a long period of time. The vacuum packaging pouch is flexible, and closely adheres to solid-containing foods easily, so that degassing at the time of vacuum packaging is easy. Therefore, the vacuum packaging pouch allows reduction in the amount of residual oxygen in the vacuum packaging pouch, and is excellent in long-term food storage performance. In addition, since angulated portions or creased portions are less likely to be formed after vacuum packaging, defects such as pin holes and cracks are less likely to occur. Furthermore, the vacuum packaging pouch can suppress the occurrence of pin holes due to friction between the vacuum packaging pouches or between the vacuum packaging pouch and a cardboard. Moreover, since the vacuum packaging pouch is excellent in gas barrier properties and water vapor properties and maintains its barrier properties even under severe temperature and humidity conditions, the vacuum packaging pouch can suppress quality degradation of the packaged article (e.g., a food) over a long period of time.

The vacuum packaging pouch may be formed by stacking together at least one multi-layer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a vacuum packaging pouch include a configuration of multi-layer barrier film/polyamide layer/PO layer and a configuration of polyamide layer/multi-layer barrier film/PO layer. In these configurations, for example, a polyamide film can be used as the base of the multi-layer barrier film. The vacuum packaging pouch using such a composite structure is excellent particularly in the barrier properties exhibited after vacuum packaging or after vacuum packaging and heat sterilization. Adhesive layers may be provided between the above layers. In the case where the layer (Y) is stacked only on one surface of the base, the layer (Y) may be located outwardly or inwardly of the base in the vacuum packaging material.

The formed product including the composite structure of the present invention may be a spout pouch for packaging various liquid substances. The spout pouch can be used as a container for liquid drinks (e.g., soft drinks), jelly drinks, yogurts, fruit sauces, seasoning agents, functional water, liquid foods, etc. Also, the spout pouch can be preferably used as a container for liquid medical products such as amino acid infusions, electrolyte infusions, carbohydrate infusions, and fat emulsions for infusions. The spout pouch is excellent in gas barrier properties and water vapor barrier properties, and maintains its barrier properties even under severe temperature and humidity conditions. Therefore, the use of the spout pouch makes it possible to prevent the packaged article from being altered after transportation and after long-term storage. In addition, since the spout pouch has good transparency, it is easy to identify the packaged article or to check for alteration of the packaged article caused by degradation.

The spout pouch may be formed by stacking together at least one multi-layer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a spout pouch include a configuration of multi-layer barrier film/polyamide layer/PO layer and a configuration of a polyamide layer/multi-layer barrier film/PO layer. Adhesive layers may be provided between the above layers. In the case where the layer (Y) is stacked only on one surface of the base, the gas barrier layer may be located outwardly or inwardly of the base in the spout pouch.

The formed product including the composite structure of the present invention may be a laminated tube container for packaging cosmetics, chemicals, medical products, foods, dentifrices, etc. The laminated tube container is excellent in gas barrier properties and water vapor barrier properties, and maintains its barrier properties even under severe temperature and humidity conditions. In addition, since the laminated tube container has good transparency, it is easy to identify the packaged article or to check for alteration of the packaged article caused by degradation.

The laminated tube container may be formed by stacking together at least one multi-layer barrier film and at least another layer. Examples of the other layer include a polyamide layer, a polyolefin layer (which may be a pigment-containing polyolefin layer), an inorganic deposited film layer, an EVOH layer, and an adhesive layer. The number and stacking order of these layers are not particularly limited. In the case where heat sealing is performed, a configuration adapted for that purpose is employed.

Particularly preferred configurations for a laminated tube container include a configuration of PO layer/multi-layer barrier film/PO layer and a configuration of PO layer/pigment-containing PO layer/PO layer/multi-layer barrier film/PO layer. Adhesive layers may be disposed between the above layers. In the case where the layer (Y) is stacked only on one surface of the base, the layer (Y) may be located outwardly or inwardly of the base in the laminated tube container.

The formed product including the composite structure of the present invention may be an infusion bag, and may be, for example, an infusion bag to be filled with a liquid medical product such as an amino acid infusion, an electrolyte infusion, a carbohydrate infusion, or a fat emulsion for infusions. The infusion bag is excellent in gas barrier properties and water vapor barrier properties, and maintains its barrier properties even under severe temperature and humidity conditions. Therefore, with the infusion bag, it is possible to prevent the packed liquid medical product from being altered before heat sterilization, during heat sterilization, after heat sterilization, after transportation, and after storage.

The infusion bag may be formed by stacking together at least one multi-layer barrier film and at least another layer. Examples of the other layer include a polyamide layer, a polyolefin layer, an inorganic deposited film layer, an EVOH layer, a thermoplastic elastomer layer, and an adhesive layer. The number and stacking order of these layers are not particularly limited. In the case where heat sealing is performed, a configuration adapted for that purpose is employed.

Particularly preferred configurations of the composite structure for an infusion bag include a configuration of multi-layer barrier film/polyamide layer/PO layer and a configuration of polyamide layer/multi-layer barrier film/PO layer. Adhesive layers may be disposed between the above layers. In the case where the layer (Y) is stacked only on one surface of the base, the layer (Y) may be located outwardly or inwardly of the base in the infusion bag.

The formed product including the composite structure of the present invention may be a cover of a container to be filled with foods such as processed meat products, processed vegetable products, processed seafood products, and fruits. The container cover is excellent in gas barrier properties and water vapor barrier properties, and maintains its barrier properties even under severe temperature and humidity conditions. Therefore, quality degradation of the contained food can be suppressed over a long period of time. The container cover is used preferably as a cover of a container used for storage of the contained article such as a food product.

The container cover may be formed by stacking together at least one multi-layer barrier film and at least another layer. Examples of the other layer include a polyamide layer, a polyolefin layer, an inorganic deposited film layer, an EVOH layer, a polyester layer, a paper layer, and an adhesive layer. The number and stacking order of these layers are not particularly limited. In the case where heat sealing is performed, a configuration adapted for that purpose is employed.

Particularly preferred configurations of the composite structure for a container cover include a configuration of multi-layer barrier film/polyamide layer/PO layer and a configuration of multi-layer barrier film/PO layer. In these configurations, for example, a polyamide film can be used as the base of the multi-layer barrier film. The cover having such a configuration is excellent particularly in the gas barrier properties exhibited after heat sterilization or after heat sterilization and transportation. Adhesive layers may be provided between the above layers. In the case where the layer (Y) lies on one surface of the base, the layer (Y) may be located inwardly of the base (on the container-side) or outwardly of the base.

The formed product including the composite structure of the present invention may be a paper container. The paper container undergoes only slight deterioration of the gas barrier properties and water vapor barrier properties even when subjected to bending processing. The paper container is used preferably as a window container by virtue of the good transparency of the layer (Y). Furthermore, the paper container is suitable for heating by a microwave oven.

The paper container may be formed by stacking together at least one multi-layer barrier film and at least another layer. Examples of the other layer include a polyester layer, a polyamide layer, a polyolefin layer (which may be a heat-resistant polyolefin layer or a biaxially-oriented heat-resistant polyolefin layer), an inorganic deposited film layer, a hydroxyl group-containing polymer layer, a paper layer, and an adhesive layer. The number and stacking order of these layers are not particularly limited. In the case where heat sealing is performed, a configuration adapted for that purpose is employed.

Particularly preferred configurations of the composite structure for a paper container include a configuration of heat-resistant polyolefin layer/paper layer/heat-resistant polyolefin layer/multi-layer barrier film/heat-resistant polyolefin layer. Adhesive layers may be disposed between the above layers. In the above example, the heat-resistant polyolefin layers are composed of, for example, either a biaxially-oriented heat-resistant polyolefin film or a non-oriented heat-resistant polyolefin film. From the standpoint of ease of a forming process, the heat-resistant polyolefin layers disposed as the outermost layers of the composite structure are preferably non-oriented polypropylene films. Similarly, the heat-resistant polyolefin layer disposed inwardly of the outermost layers of the composite structure is preferably an non-oriented polypropylene film. In a preferred example, all the heat-resistant polyolefin layers included in the composite structure are non-oriented polypropylene films.

The formed product including the composite structure of the present invention may be a vacuum insulator applicable to various uses in which coldness or warmth needs to be kept. The vacuum insulator can maintain heat insulating effect over a long period of time, and thus can be used, for example, in the following: a heat insulating material for home electric appliances such as refrigerators, hot-water supply systems, and rice cookers; a residential heat insulating material used in walls, ceilings, attics, floors, etc.; a vehicle roof material; and an insulating panel of automatic vending machines etc.

The vacuum insulator may be formed by stacking together at least one multi-layer barrier film and at least another layer. Examples of the other layer include a polyester layer, a polyamide layer, a polyolefin layer, and an adhesive layer. The number and stacking order of these layers are not particularly limited. In the case where heat sealing is performed, a configuration adapted for that purpose is employed.

Particularly preferred configurations of the composite structure for a vacuum insulator include a configuration of multi-layer barrier film/polyamide layer/PO layer and a configuration of polyamide layer/multi-layer barrier film/PO layer. Adhesive layers may be provided between the above layers. In the case where the layer (Y) is stacked only on one surface of the base, the layer (Y) may be located outwardly or inwardly of the base in the vacuum insulator.

Preferred examples of the configuration of the composite structure that is particularly preferable for a protective film of a solar cell are listed below. Although the composite structure may have the adhesive layer (H) between the base and the water vapor barrier layer, the adhesive layer (H) is omitted for the specific examples listed below.

(1) Water vapor barrier layer/base/water vapor barrier layer
(2) Base/water vapor barrier layer/adhesive layer/surface protective layer
(3) Water vapor barrier layer/base/water vapor barrier layer/adhesive layer/surface protective layer In preferred examples of the above configurations (1) to (3), the base is a polyethylene terephthalate film or a polycarbonate film. In preferred examples of the above configurations (2) and (3), the adhesive layer is made of polyvinyl acetal (e.g., polyvinyl butyral), and the surface protective layer is an acrylic resin layer. Furthermore, in other preferred examples of the above configurations (2) and (3), the adhesive layer is made of polyurethane, and the surface protective layer is made of ethylene-tetrafluoroethylene copolymer. The above configurations (2) and (3) are preferable for a protective film of a solar cell.

[Method for Producing Composite Structure]

Hereinafter, a composite structure production method of the present invention will be described. With this method, the composite structure of the present invention can easily be produced. The materials used for the composite structure production method of the present invention, and the configuration of the composite structure, are the same as those mentioned above. Therefore, redundant descriptions are omitted in some cases. For example, the descriptions on the composite structure of the present invention can be applied for the metal oxide (A), the phosphorus compound (B), and the polymer (C). The matters described for the production method can be applied to the composite structure of the present invention. The matters described for the composite structure of the present invention can be applied to the production method of the present invention.

The composite structure production method of the present invention includes steps (I), (II), and (III). In the step (I), the metal oxide (A), at least one compound containing a site capable of reacting with the metal oxide (A), and a solvent are mixed to prepare the coating liquid (U) including the metal oxide (A), the at least one compound, and the solvent. In the step (II), the coating liquid (U) is applied onto the base (X) to form a precursor layer of the layer (Y) on the base (X). In the step (III), the precursor layer is subjected to heat treatment at a temperature of 140° C. or more to form the layer (Y) on the base (X). The coating liquid (U) is maintained at a temperature of 50° C. or less during the period from when the coating liquid (U) is prepared in the step (I) until the coating liquid (U) is applied in the step (II). The coating liquid (U) is maintained at a temperature of more preferably 30° C. or less or even more preferably 20° C. or less from when the coating liquid (U) is prepared in the step (I) until the coating liquid (U) is applied in the step (II).

[Step (I)]

The at least one compound used in the step (I), which contains a site capable of reacting with the metal oxide (A), may be referred to as "at least one compound (Z)" hereinafter. In the step (I), at least the metal oxide (A), the at least one compound (Z), and the solvent are mixed. From one standpoint, a raw material including the metal oxide (A) and the at least one compound (Z) is subjected to reaction in the solvent in the step (I). The raw material may include another compound in addition to the metal oxide (A) and the at least one compound (Z). Typically, the metal oxide (A) is mixed in the form of particles.

In the coating liquid (U), the number of moles $N_M$ of the metal atoms (M) that are constituents of the metal oxide (A) and the number of moles $N_P$ of phosphorus atoms included in the phosphorus compound (B) satisfy a relation of $1.0 \leq$(the number of moles $N_M$)/(the number of moles $N_P$)$\leq 3.6$. The preferred range of the value of (the number of moles $N_M$)/(the number of moles $N_P$) has previously been described. Therefore, redundant descriptions are omitted.

The at least one compound (Z) includes the phosphorus compound (B). The number of moles of metal atoms included in the at least one compound (Z) is preferably 0 to 1 time the number of moles of phosphorus atoms included in the phosphorus compound (B). Typically, the at least one compound (Z) is a compound containing a plurality of sites capable of reacting with the metal oxide (A), and the number of moles of metal atoms included in the at least one compound (Z) is 0 to 1 time the number of moles of phosphorus atoms included in the phosphorus compound (B).

When the ratio, (the number of moles of metal atoms included in the at least one compound (Z))/(the number of moles of phosphorus atoms included in the phosphorus compound (B)), is adjusted in the range of 0 to 1 (e.g., in the range of 0 to 0.9), a composite structure that has more excellent water vapor barrier properties and stability of water vapor barrier properties can be obtained. In order to further improve the water vapor barrier properties of the composite structure and the stability of water vapor barrier properties, the ratio is preferably 0.3 or less, more preferably 0.05 or less, and even more preferably 0.01 or less, and may be 0. Typically, the at least one compound (Z) consists only of the phosphorus compound (B). In the step (I), the ratio can easily be lowered.

The step (I) preferably includes the following steps (a) to (c).

Step (a): Step of preparing a liquid (S) including the metal oxide (A)

Step (b): Step of preparing a solution (T) including the phosphorus compound (B)

Step (c): Step of mixing the liquid (S) and the solution (T) obtained in the steps (a) and (b)

Here, both the liquid (S) and the solution (T) have a temperature of 50° C. or less when mixed in the step (c).

The step (b) may be performed prior to, simultaneously with, or subsequent to the step (a). Hereinafter, each of the steps will be described more specifically.

In the step (a), the liquid (S) including the metal oxide (A) is prepared. The liquid (S) is a solution or a dispersion liquid. The liquid (S) can be prepared, for example, by a technique employed in commonly-known sol-gel processes. For example, the liquid (S) can be prepared by mixing the above-mentioned compound (L)-based substance, water, and an acid catalyst or organic solvent added as necessary, and subjecting the compound (L)-based substance to condensation or hydrolytic condensation by a technique employed in commonly-known sol-gel processes. A dispersion liquid itself of the metal oxide (A) obtained by condensation or hydrolytic condensation of the compound (L)-based substance can be used as the liquid (S) including the metal oxide (A). However, a particular process (deflocculation as described above, addition or removal of the solvent for concentration control, or the like) may be performed for the dispersion liquid as necessary.

The step (a) may include a step of subjecting, to condensation (e.g., hydrolytic condensation), at least one selected from the group consisting of the compound (L) and a hydrolysate of the compound (L). Specifically, the step (a) may include a step of subjecting, to condensation or hydrolytic condensation, at least one selected from the group consisting of the compound (L), a partial hydrolysate of the compound (L), a complete hydrolysate of the compound (L), a partial hydrolytic condensate of the compound (L), and a condensate formed by condensation of a part of the complete hydrolysate of the compound (L).

As another example of the method for preparing the liquid (S), there can be mentioned a method including the following steps. First, a metal is gasified by thermal energy in the form of metal atoms, and the metal atoms are brought into contact with a reaction gas (oxygen) to generate molecules and clusters of a metal oxide. Thereafter, the molecules and clusters are cooled instantly to produce small-diameter particles of the metal oxide (A). Next, the particles are dispersed in water or an organic solvent to obtain the liquid (S) (dispersion liquid including the metal oxide (A)). In order to enhance the dispersibility in water or an organic solvent, the particles of the metal oxide (A) may be subjected to surface treatment, or a stabilizing agent such as a surfactant may be added to the particles. The dispersibility of the metal oxide (A) may be improved by adjustment of the pH.

As still another example of the method for preparing the liquid (S), there can be mentioned a method in which the metal oxide (A) in the form of a bulk is pulverized using a pulverizer such as a ball mill or a jet mill, and the pulverized metal oxide (A) is dispersed in water or an organic solvent to prepare the liquid (S) (dispersion liquid including the metal oxide (A)). However, in the case of this method, control of the shape and size distribution of the particles of the metal oxide (A) may be difficult.

The type of the organic solvent usable in the step (a) is not particularly limited. For example, alcohols such as methanol, ethanol, isopropanol, and normal-propanol, are suitably used.

The content of the metal oxide (A) in the liquid (S) is preferably in the range of 0.1 mass % to 30 mass %, more preferably in the range of 1 mass % to 20 mass %, and even more preferably in the range of 2 mass % to 15 mass %.

In the step (b), the solution (T) including the phosphorus compound (B) is prepared. The solution (T) can be prepared by dissolving the phosphorus compound (B) in a solvent. In the case where the solubility of the phosphorus compound (B) is low, the dissolution may be promoted by performing heating treatment or ultrasonic treatment.

The solvent used for the preparation of the solution (T) may be selected as appropriate depending on the type of the phosphorus compound (B), and preferably includes water. As long as the dissolution of the phosphorus compound (B) is not hindered, the solvent may include: an alcohol such as methanol or ethanol; an ether such as tetrahydrofuran, dioxane, trioxane, or dimethoxyethane; a ketone such as acetone or methyl ethyl ketone; a glycol such as ethylene glycol or propylene glycol; a glycol derivative such as methyl cellosolve, ethyl cellosolve, or n-butyl cellosolve; glycerin; acetonitrile; an amide such as dimethylformamide; dimethylsulfoxide; sulfolane, or the like.

The content of the phosphorus compound (B) in the solution (T) is preferably in the range of 0.1 mass % to 99 mass %, more preferably in the range of 0.1 mass % to 95 mass %, and even more preferably in the range of 0.1 mass % to 90 mass %. The content of the phosphorus compound (B) in the solution (T) may be in the range of 0.1 mass % to 50 mass %, may be in the range of 1 mass % to 40 mass %, or may be in the range of 2 mass % to 30 mass %.

In the step (c), the liquid (S) and the solution (T) are mixed. When mixing the liquid (S) and the solution (T), it is preferable to perform the mixing at a reduced addition rate under vigorous stirring in order to suppress a local reaction. In this case, the solution (T) may be added to the liquid (S) being stirred, or the liquid (S) may be added to the solution (T) being stirred. When mixed in the step (c), both the liquid (S) and the solution (T) have a temperature of preferably 50° C. or less, more preferably 30° C. or less, even more preferably 20° C. or less. The inventors of the present application have found, for the first time, that aggregation between the metal oxide (A) particles is prevented by adjusting the temperatures of the liquid (S) and the solution (T) to 50° C. or less when they are mixed. According to this method, the metal oxide (A) and the phosphorus compound (B) are uniformly mixed, so that the water vapor barrier properties of the resultant composite structure and the stability of water vapor barrier properties can be improved. Furthermore, the coating liquid (U) that is excellent in storage stability can be obtained in some cases by continuing the stirring further for about 30 minutes after the completion of the mixing.

The coating liquid (U) may include the polymer (C). The method for having the polymer (C) included in the coating liquid (U) is not particularly limited. For example, the polymer (C) in the form of a powder or a pellet may be added to and then dissolved in the liquid (S), the solution (T), or a mixed liquid of the liquid (S) and the solution (T). Alternatively, a solution of the polymer (C) may be added to and mixed with the liquid (S), the solution (T), or a mixed liquid of the liquid (S) and the solution (T). Alternatively, the liquid (S), the solution (T), or a mixed liquid of the liquid (S) and the solution (T) may be added to and mixed with a solution of the polymer (C). By having the polymer (C) contained in the solution (T), the rate of reaction between the metal oxide (A) and the phosphorus compound (B) is slowed at the time of mixing of the liquid (S) and the solution (T) in the step (c), with the result that the coating liquid (U) that is excellent in temporal stability may be obtained.

When the coating liquid (U) includes the polymer (C), a composite structure including the layer (Y) containing the polymer (C) can easily be produced.

The coating liquid (U) may include, as necessary, at least one acid compound (D) selected from acetic acid, hydrochloric acid, nitric acid, trifluoroacetic acid, and trichloroacetic acid. Hereinafter, the at least one acid compound (D) may be simply abbreviated as the "acid compound (D)". The method for having the acid compound (D) included in the coating liquid (U) is not particularly limited. For example, the acid compound (D) itself may be added to and mixed with the liquid (S), the solution (T), or a mixed liquid of the liquid (S) and the solution (T). Alternatively, a solution of the acid compound (D) may be added to and mixed with the liquid (S), the solution (T), or a mixed liquid of the liquid (S) and the solution (T). Alternatively, the liquid (S), the solution (T), or a mixed liquid of the liquid (S) and the solution (T) may be added to and mixed with a solution of the acid compound (D).

When the solution (T) includes the acid compound (D), the rate of reaction between the metal oxide (A) and the phosphorus compound (B) is slowed at the time of mixing of the liquid (S) and the solution (T) in the step (c), with the result that the coating liquid (U) that is excellent in temporal stability may be obtained.

In the coating liquid (U) including the acid compound (D), the reaction between the metal oxide (A) and the phosphorus compound (B) is suppressed. Therefore, precipitation or aggregation of the reaction product in the coating liquid (U) can be suppressed. Thus, the use of the coating liquid (U) including the acid compound (D) improves the appearance of the resultant composite structure in some cases. In addition, the boiling point of the acid compound (D) is 200° C. or less. Therefore, in the production process of the composite structure, the acid compound (D) can easily be removed from the layer (Y), for example, by volatilizing the acid compound (D).

The content of the acid compound (D) in the coating liquid (U) is preferably in the range of 0.1 mass % to 5.0 mass %, and more preferably in the range of 0.5 mass % to 2.0 mass %. When the content is in such ranges, the effect of addition of the acid compound (D) can be obtained, and the removal of the acid compound (D) is easy. In the case where an acid substance remains in the liquid (S), the amount of the acid compound (D) to be added may be determined in view of the amount of the remaining acid substance.

The liquid itself obtained by the mixing in the step (c) can be used as the coating liquid (U). In this case, the solvent contained in the liquid (S) or the solution (T) usually acts as a solvent of the coating liquid (U). The coating liquid (U) may be prepared by performing a process for the liquid obtained by the mixing in the step (c). For example, a process such as addition of an organic solvent, adjustment of the pH, adjustment of the viscosity, or addition of an additive, may be performed.

An organic solvent may be added to the liquid obtained by the mixing in the step (c), to the extent that the stability of the resultant coating liquid (U) is not impaired. In some cases, the addition of the organic solvent makes it easy to apply the coating liquid (U) onto the base (X) in the step (II). The organic solvent is preferably one capable of being uniformly mixed in the resultant coating liquid (U). Preferred examples of the organic solvent include: alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol and propylene glycol; glycol derivatives such as methyl cellosolve, ethyl cellosolve, and n-butyl cellosolve; glycerin; acetonitrile; amides such as dimethylformamide and dimethylacetamide; dimethylsulfoxide; and sulfolane.

From the standpoint of the storage stability of the coating liquid (U) and from the standpoint of the performance of the coating liquid (U) in terms of application onto the base, the solid content concentration of the coating liquid (U) is preferably in the range of 1 mass % to 20 mass %, more preferably in the range of 2 mass % to 15 mass %, and even more preferably in the range of 3 mass % to 10 mass %. The solid content concentration of the coating liquid (U) can be calculated, for example, by adding a predetermined amount of the coating liquid (U) onto a laboratory dish, exposing the coating liquid (U) to a temperature of 100° C. together with the laboratory dish to remove volatile components such as the solvent, and dividing the mass of the remaining solid content by the mass of the initially-added coating liquid (U). In that case, it is preferable that the mass of the remaining solid content be measured each time drying is performed for a given period of time, and the solid content concentration be determined using the last-measured mass of the remaining solid content when the difference between the values of the mass obtained by the two successive measurements has reduced to a negligible level.

From the standpoint of the storage stability of the coating liquid (U) and the water vapor barrier properties of the composite structure, the pH of the coating liquid (U) is preferably in the range of 0.5 to 6.0, more preferably in the range of 0.5 to 5.0, and even more preferably in the range of 0.5 to 4.0.

The pH of the coating liquid (U) can be adjusted by a commonly-known method, and can be adjusted, for example, by adding an acidic compound or a basic compound. Examples of the acidic compound include hydrochloric acid, nitric acid, sulfuric acid, acetic acid, butyric acid, and ammonium sulfate. Examples of the basic compound include sodium hydroxide, potassium hydroxide, ammonia, trimethylamine, pyridine, sodium carbonate, and sodium acetate.

The coating liquid (U) changes in state over time, and tends to be converted finally into a gel composition or to undergo precipitation. The time to occurrence of such change in state depends on the composition of the coating liquid (U). In order to stably apply the coating liquid (U) onto the base (X), the viscosity of the coating liquid (U) is preferably stable over a long time. When the viscosity at the completion of the step (I) is defined as a reference viscosity, it is preferable to prepare the solution (U) so that the viscosity measured by a Brookfield viscometer (B-type viscometer: 60 rpm) be five times or less the reference viscosity even after the solution (U) is allowed to stand at 25° C. for two days. In many cases where the coating liquid (U) has a viscosity within such a range and is excellent in preservation stability, the composite structure that has more excellent water vapor barrier properties is obtained.

For example, adjustment of the solid content concentration, adjustment of the pH, or addition of a viscosity modifier can be employed as the method for adjusting the viscosity of the coating liquid (U) to the above range. Examples of the viscosity modifier include carboxymethyl cellulose, starch, bentonite, tragacanth gum, stearic acid salts, alginic acid salts, methanol, ethanol, n-propanol, and isopropanol.

The coating liquid (U) may include another substance other than the above-described substances, as long as the effect of the present invention is obtained. For example, the coating liquid (U) may include: an inorganic acid metal salt such as a metal carbonate, a metal hydrochloride, a metal nitrate, a metal hydrogen carbonate, a metal sulfate, a metal hydrogen sulfate, a metal borate, or an metal aluminate; an organic acid metal salt such as a metal oxalate, a metal acetate, a metal tartrate, or a metal stearate; a metal complex such as a metal acetylacetonate complex (aluminum acetylacetonate or the like), a cyclopentadienyl metal complex (titanocene or the like), or a cyanometal complex; a layered clay compound; a crosslinking agent; a polymer compound other than the polymer (C); a plasticizer; an antioxidant; an ultraviolet absorber; or a flame retardant.

[Step (II)]

In the step (II), a precursor layer of the layer (Y) is formed on the base (X) by applying the coating liquid (U) onto the base (X). The coating liquid (U) may be applied directly onto at least one surface of the base (X). Alternatively, before application of the coating liquid (U), the adhesive layer (H) may be formed on the surface of the base (X), for example, by treating the surface of the base (X) with a commonly-known anchor coating agent or by applying a commonly-known adhesive agent onto the surface of the base (X).

The coating liquid (U) may be subjected to degassing and/or defoaming as necessary. Examples of the method for degassing and/or defoaming are those using vacuum drawing, heating, centrifugation, ultrasonic waves, etc. A method including vacuum drawing can be preferably used.

A viscosity of the coating liquid (U) to be applied in the step (II) as measured by a Brookfield rotational viscometer (SB-type viscometer: Rotor No. 3, Rotational speed of 60 rpm) is preferably 3000 mPa·s or less and more preferably 2000 mPa·s or less at a temperature at which the coating liquid (U) is applied (this temperature is 50° C. or less). When the viscosity is 3000 mPa·s or less, the leveling of the coating liquid (U) is improved, and the composite structure that is more excellent in appearance can be obtained. The viscosity of the coating liquid (U) to be applied in the step (II) can be adjusted depending on the concentration, the temperature, and the length of time or intensity of stirring performed after the mixing in the step (c). For example, the viscosity can be lowered by performing stirring for a long time after the mixing in the step (c).

The method for applying the coating liquid (U) onto the base (X) is not particularly limited, and a commonly-known method can be employed. Examples of preferred methods include casting, dipping, roll coating, gravure coating, screen printing, reverse coating, spray coating, kiss coating, die coating, metering bar coating, chamber doctor-using coating, and curtain coating.

In the step (II), the precursor layer of the layer (Y) is formed usually by removing the solvent in the coating liquid (U). The method for removing the solvent is not particularly limited, and a commonly-known drying method can be used. Specifically, drying methods such as hot-air drying, heat roll contact drying, infrared heating, and microwave heating can be used alone or in combination. The drying temperature is preferably 0° C. to 15° C. or more lower than the onset temperature of fluidization of the base (X). In the case where the coating liquid (U) includes the polymer (C), the drying temperature is preferably 15° C. to 20° C. or more lower than the onset temperature of pyrolysis of the polymer (C). The drying temperature is preferably in the range of 70° C. to 200° C., more preferably in the range of 80° C. to 180° C., and even more preferably in the range of 90° C. to 160° C. The removal of the solvent may be carried out under ordinary pressure or under reduced pressure. Alternatively, the solvent may be removed by heat treatment in the step (III) described later.

In the case where the layers (Y) are stacked on both surfaces of the base (X) that is in the form of a layer, a first layer (a precursor layer of a first layer (Y)) may be formed by applying the coating liquid (U) onto one surface of the base (X) and then removing the solvent, and a second layer (a precursor layer of a second layer (Y)) may be subsequently formed by applying the coating liquid (U) onto the other surface of the base (X) and then removing the solvent. The compositions of the coating liquids (U) applied onto the two surfaces may be the same or different. As previously described, it has been surprisingly discovered that when the composite structure of the invention includes a plurality of layers (Y), the water vapor barrier properties are considerably improved. When the layers (Y) are stacked on both surfaces of the base (X), considerable improvement in water vapor barrier properties can be achieved more economically.

In the case where the layers (Y) are stacked on a plurality of surfaces of the base (X) that has a three-dimensional shape, a layer (a precursor layer of the layer (Y)) may be formed on each of the surfaces by the above method. Alternatively, a plurality of layers (precursor layers of the layers (Y)) may be simultaneously formed by applying the coating liquid (U) simultaneously onto the plurality of surfaces of the base (X) and drying the coating liquid (U).

[Step (III)]

In the step (III), the layer (Y) is formed by subjecting the precursor layer (the precursor layer of the layer (Y)) formed in the step (II) to heat treatment at a temperature of 140° C. or more.

In the step (III), a reaction in which the particles of the metal oxide (A) are bonded together via phosphorus atoms (phosphorus atoms derived from the phosphorus compound (B)) proceeds. From another standpoint, a reaction in which the reaction product (R) is generated proceeds in the step (III). In order for the reaction to proceed sufficiently, the temperature of the heat treatment is 140° C. or more, preferably 170° C. or more, and more preferably 190° C. or more. A lowered heat treatment temperature increases the time required to achieve sufficient reaction, and causes reduction in productivity. The preferred upper limit of the heat treatment temperature varies depending on, for example, the type of the base (X). For example, in the case where a thermoplastic resin film made of polyamide resin is used as the base (X), the heat treatment temperature is preferably 190° C. or less. In the case where a thermoplastic resin film made of polyester resin is used as the base (X), the heat treatment temperature is preferably 220° C. or less. The heat treatment can be carried out in air, a nitrogen atmosphere, an argon atmosphere, or the like.

The length of time of the heat treatment is preferably in the range of 0.1 seconds to 1 hour, more preferably in the range of 1 second to 15 minutes, and even more preferably in the range of 5 seconds to 300 seconds. In an example, the heat treatment is performed at 140° C. to 220° C. for 0.1 seconds to 1 hour. In another example, the heat treatment is performed at 170° C. to 200° C. for 5 seconds to 300 seconds (e.g., 10 seconds to 300 seconds).

The method of the present invention for producing the composite structure may include a step of irradiating the layer (Y) or the precursor layer of the layer (Y) with an ultraviolet ray. The ultraviolet irradiation may be performed at any time after the step (II) (e.g., after the removal of the solvent of the applied coating liquid (U) is almost completed). The method of the irradiation is not particularly limited, and a commonly-known method can be employed. The wavelength of the ultraviolet ray for irradiation is preferably in the range of 170 nm to 250 nm, and more preferably in the range of 170 nm to 190 nm and/or 230 nm to 250 nm. Alternatively, irradiation with a radioactive ray such as an electron ray or a γ ray may be performed instead of the ultraviolet irradiation. Performing the ultraviolet irradiation may allow the composite structure to exhibit higher water vapor barrier performance.

In the case of treating the surface of the base (X) with a commonly-known anchor coating agent or applying a commonly-known adhesive agent onto the surface of the base (X) before application of the coating liquid (U) in order to dispose the adhesive layer (H) between the base (X) and the layer (Y), aging treatment is preferably performed. Specifically, the base (X) having the coating liquid (U) applied thereto is preferably left at a relatively low temperature for a long time after the application of the coating liquid (U) but before the heat treatment of the step (III). The temperature of the aging treatment is preferably less than 110° C., more preferably 100° C. or less, and even more preferably 90° C. or less. The temperature of the aging treatment is preferably 10° C. or more, more preferably 20° C. or more, and even more preferably 30° C. or more. The length of time of the aging treatment is preferably in the range of 0.5 days to 10 days, more preferably in the range of 1 day to 7 days, and even more preferably in the range of 1 day to 5 days. Performing such aging treatment further enhances the adhesive force between the base (X) and the layer (Y).

The composite structure itself obtained through the heat treatment of the step (III) can be used as the composite structure of the present invention. However, as described above, another member (another layer or the like) may be further adhered or formed onto the composite structure, and the resultant structure may be used as the composite structure of the present invention. The adhesion of the member can be performed by a commonly-known method.

EXAMPLES

Hereinafter, the present invention will be described more specifically with reference to examples. However, the present invention is not limited in any respect by the examples given below. The measurements and evaluations in the examples and comparative examples were carried out by the methods (1) to (4) described below.

(1) Viscosity of Coating Liquid (U)

For the viscosity of the coating liquid (U), 800 mL of the coating liquid (U) was put into a glass container with a volume of 1 L, and measurement was performed using a Brookfield rotational viscometer (SB-type viscometer: Rotor No. 3, Rotational speed of 60 rpm) based on JIS K 7117.

(2) Appearance of Composite Structure

The appearances of the composite structures obtained were evaluated by visual observation as follows.

S: Very good appearance that was colorless, transparent, and uniform

A: Good appearance that was slightly opaque or non-uniform

B: No continuous layer was obtained such as due to the coating liquid being repelled (3) X-Ray Photoelectron Spectroscopy Analysis by X-ray photoelectron spectroscopy (XPS) was carried out using a scanning X-ray photoelectron spectrometer ("PHI Quantera SXM" manufactured by ULVAC-PHI, Inc). The analysis was performed for a region of 1000 µm×1000 µm with an acceptance angle of 90° in a vacuum of $1\times10^{-6}$ Pa. In the case where the surface of the layer (Y) of the composite structure was unclean, argon sputtering was performed and the inside of the layer (Y) was subjected to the analysis.

(4) Water Vapor Barrier Properties

The moisture permeability (water vapor transmission rate; WVTR) under conditions of 85° C. and 85/0% RH was measured using a calcium chloride gravimetric method. Specifically, two composite structures having a size of 10 cm×10 cm were fabricated, the two structures were stacked on each other in such a manner that CPP layers described later were located interiorly, and then the three sides of the stack were heat-sealed up to 5 mm from their ends. A calcium chloride powder was added between the two heat-sealed composite structures in an amount of 20 g, and then the remaining fourth side was similarly heat-sealed. In this manner, a pouch containing calcium chloride was fabricated. Next, this pouch was placed and held in a thermo-hygrostat maintained at 85° C. and 85/0% RH, and a weight increase was measured at every predetermined time interval. This weight increase was due to water having permeated the pouch. Therefore, the moisture permeability (in units of $g/(m^2 \cdot day)$) was calculated from the weight increase. This measurement was performed continuously for 2000 hours, and average moisture permeabilities during the initial 100 hours (0 to 100 hours) and during the last 100 hours (1900 to 2000 hours) were calculated.

The moisture permeability (water vapor transmission rate; WVTR) under conditions of 40° C. and 90/0% RH was measured using a water vapor transmission measurement apparatus ("GTR-WV" manufactured by GTR Tec Corporation) in accordance with gas chromatography (JIS-K 7129-C). Specifically, the moisture permeability (in units of $g/(m^2 \cdot day)$) was measured under conditions that the temperature was 40° C., the humidity on the water vapor supply-side was 90% RH, and the humidity on the carrier gas-side was 0% RH.

Example 1

An amount of 230 parts by mass of distilled water was heated up to 70° C. under stirring. An amount of 88 parts by mass of aluminum isopropoxide was added dropwise to the distilled water over 1 hour, the liquid temperature was gradually increased up to 95° C., and isopropanol generated was distilled off. In this manner, hydrolytic condensation was performed. To the obtained liquid was added 4.0 parts by mass of a 60 mass % nitric acid aqueous solution, followed by stirring at 95° C. for 3 hours to deflocculate the aggregate of the particles of the hydrolytic condensate. Thereafter, the resultant liquid was concentrated so that the solid content concentration was 10 mass % in terms of alumina concentration. To 18.66 parts by mass of the thus-obtained dispersion liquid were added 58.19 parts by mass of distilled water, 19.00 parts by mass of methanol, and 0.50 parts by mass of a 5 mass % polyvinyl alcohol (hereinafter, referred to as PVA) aqueous solution. The resultant mixture was made homogeneous by stirring to obtain a dispersion liquid (S1). In addition, 3.66 parts by mass of an 85 mass % phosphoric acid aqueous solution was used as a solution (T1). Subsequently, the temperatures of both the dispersion liquid (S1) and the solution (T1) were adjusted to 15° C. Next, with the liquid temperatures maintained at 15° C., the solution (T1) was added dropwise to the dispersion liquid (S1) being stirred. As a result, a coating liquid (U1) was obtained. With the temperature of the obtained coating liquid (U1) held at 15° C., the coating liquid (U1) continued to be stirred until its viscosity reached 1500 mPa·s or less.

Next, an oriented polyethylene terephthalate film ("Lumirror P60" (trade name) manufactured by TORAY INDUSTRIES, INC. and having a thickness of 12 µm) was prepared as a base (this film may be abbreviated as "PET" hereinafter). The coating liquid (U1) was coated onto the base (PET) with a bar coater in such a manner that the thickness after drying was 0.5 µm. The temperature of the coating liquid (U1) was kept at 15° C. until the coating process. The base having the coating liquid (U1) applied thereto was dried at 110° C. for 5 minutes to form a precursor layer of a layer (Y1). The obtained layered body was subjected to heat treatment using a dryer at 200° C. for 1 minute, and thus a composite structure (A1) having a configuration of layer (Y1) (0.5 µm)/PET (12 µm) was obtained. For the obtained composite structure (A1), appearance evaluation, and X-ray photoelectron spectroscopy (XPS) of the layer (Y1) (layer (Y)), were carried out by the methods described above.

Subsequently, the same PET as used above and a non-oriented polypropylene film ("RXC-21" (trade name) manufactured by Tohcello Co., Ltd. and having a thickness of 50 µm) were prepared (the polypropylene film may be abbreviated as "CPP" hereinafter). A two-component adhesive agent ("A-520" (trade name) and "A-50" (trade name) manufactured by Mitsui Takeda Chemicals, Inc.) was coated onto the PET and CPP, followed by drying. The PET, the CPP, and the composite structure (A1) were sequentially laminated. In this manner, a composite structure (B1) having a configuration of PET/adhesive agent/layer (Y1)/PET/adhesive agent/CPP was obtained. For the obtained composite structure (B1), the moisture permeabilities under conditions of 85° C. and 85/0% RH and conditions of 40° C. and 90/0% RH were evaluated by the methods described above.

Examples 2 to 6

Production of, measurement on, and evaluation of composite structures were performed in the same manner as in Example 1, except that the ratio $N_M/N_P$ was changed in accordance with Table 1.

Examples 7 to 8

Production of, measurement on, and evaluation of composite structures were performed in the same manner as in Example 1, except that the temperatures during the production process of the coating liquids were changed in accordance with Table 1.

Example 9

Production of, measurement on, and evaluation of composite structures were performed in the same manner as in Example 1, except that the length of time of stirring of the coating liquid was reduced, and the stirring was stopped at the moment the viscosity of the coating liquid reached 2500 mPa·s.

Examples 10 to 11

Production of, measurement on, and evaluation of composite structures were performed in the same manner as in Example 1, except that the temperature of the heat treatment was changed in accordance with Table 1.

Example 12

Production of, measurement on, and evaluation of composite structures were performed in the same manner as in Example 1, except that PVA was not used.

Examples 13 to 14

Production of, measurement on, and evaluation of composite structures were performed in the same manner as in Example 1, except that starch or polyacrylic acid was used instead of PVA, and the amount used was increased by a factor of 20.

Example 15

Production of, measurement on, and evaluation of composite structures were performed in the same manner as in Example 1, except that phosphoric acid and phosphonic acid were used in combination at a molar ratio of 9:1 instead of phosphoric acid alone.

Example 16

Production of, measurement on, and evaluation of composite structures were performed in the same manner as in Example 1, except that a dispersion liquid (S16) was used instead of the dispersion liquid (S1). The dispersion liquid (S16) was produced by the following method.

First, 230 parts by mass of distilled water was heated up to 75° C. under stirring using a pressure-resistant container. An amount of 88 parts by mass of aluminum isopropoxide was added dropwise to the distilled water over 1 hour, the liquid temperature was gradually increased up to 95° C., and isopropanol generated was distilled off. In this manner, hydrolytic condensation was performed. To the obtained liquid was added 2.6 parts by mass of acetic acid, followed by deflocculation by stirring at 140° C. for 4 hours. Thereafter, the resultant liquid was concentrated so that the solid content concentration was 10 mass % in terms of alumina concentration. To 18.66 parts by mass of the thus-obtained dispersion liquid were added 58.19 parts by mass of distilled water, 19.00 parts by mass of methanol, and 0.50 parts by mass of a 5 mass % polyvinyl alcohol (hereinafter, referred to as PVA) aqueous solution. The resultant mixture was made homogeneous by stirring to obtain the dispersion liquid (S16).

Example 17

Production of, measurement on, and evaluation of composite structures were performed in the same manner as in Example 1, except that the layers (Y) were stacked on both surfaces of the base.

Example 18

Production of, measurement on, and evaluation of composite structures were performed in the same manner as in Example 1, except that an oriented nylon film ("EMBLEM ONBC" (trade name) manufactured by UNITIKA LTD. and having a thickness of 15 μm) was used as the base (this film may be abbreviated as "ONY"), and the temperature of the heat treatment was changed in accordance with Table 1.

Example 19

Production of, measurement on, and evaluation of composite structures were performed in the same manner as in Example 18, except that the layers (Y) were stacked on both surfaces of the base.

Example 20

Production of, measurement on, and evaluation of composite structures were performed in the same manner as in Example 1, except that a silica-deposited PET film of 12 μm thickness was used as the base. It should be noted that the layer (Y) was stacked on the silica-deposited surface of the silica-deposited PET film.

Comparative Example 1

Production of, measurement on, and evaluation of composite structures were performed in the same manner as in Example 1, except that phosphoric acid was not used.

Comparative Examples 2 to 3

Production of, measurement on, and evaluation of composite structures were performed in the same manner as in Example 1, except that the ratio $N_M/N_P$ was changed in accordance with Table 1.

Comparative Example 4

Production of, measurement on, and evaluation of composite structures were performed in the same manner as in Example 1, except that the temperatures during the production process of the coating liquids were changed in accordance with Table 1.

Comparative Example 5

Production of, measurement on, and evaluation of composite structures were performed in the same manner as in Example 1, except that the heat treatment was not carried out.

Comparative Example 6

Production of, measurement on, and evaluation of composite structures were performed in the same manner as in Example 1, except that the temperature of the heat treatment was set at 130° C.

Comparative Example 7

Production of a composite structure was performed in the same manner as in Example 1, except that aluminum nitrate not subjected to hydrolytic condensation was used instead of the metal oxide (alumina). The wettability by the coating liquid (U) was low, and the coating liquid (U) was repelled, so that a continuous layer was not obtained.

Reference Examples 1 to 2

An alumina-deposited PET film of 12 μm thickness and a silica-deposited PET film of 12 μm thickness were used as reference examples, and measurement on and evaluation of these films were performed in the same manner as in Example 1.

The production conditions and evaluation results for Examples and Comparative Examples are shown in the tables below. In the tables, "-" means "not used", "not calculable", "not carried out", "not measurable", or the like.

TABLE 1

| | | Layer (Y) | | | | Temperature (° C.) | | | Viscosity (mPa · s) | Heat |
| --- | --- | --- | --- | --- | --- | --- | --- | --- | --- | --- |
| | Base (X) | Compound (L) | Phosphorus compound (B) | Polymer (C) | $N_M/N_P$ | Liquid (S) | Solution (T) | Coating liquid (U) | Coating liquid (U) | treatment temperature (° C.) |
| Example 1 | PET | Al(O—iPr)$_3$ | Phosphoric acid | PVA | 1.15 | 15 | 15 | 15 | 1500 | 200 |
| Example 2 | PET | Al(O—iPr)$_3$ | Phosphoric acid | PVA | 3.57 | 15 | 15 | 15 | 1500 | 200 |
| Example 3 | PET | Al(O—iPr)$_3$ | Phosphoric acid | PVA | 2.89 | 15 | 15 | 15 | 1500 | 200 |
| Example 4 | PET | Al(O—iPr)$_3$ | Phosphoric acid | PVA | 1.92 | 15 | 15 | 15 | 1500 | 200 |
| Example 5 | PET | Al(O—iPr)$_3$ | Phosphoric acid | PVA | 1.28 | 15 | 15 | 15 | 1500 | 200 |
| Example 6 | PET | Al(O—iPr)$_3$ | Phosphoric acid | PVA | 1.04 | 15 | 15 | 15 | 1500 | 200 |
| Example 7 | PET | Al(O—iPr)$_3$ | Phosphoric acid | PVA | 1.15 | 25 | 25 | 25 | 1500 | 200 |
| Example 8 | PET | Al(O—iPr)$_3$ | Phosphoric acid | PVA | 1.15 | 35 | 35 | 35 | 1500 | 200 |
| Example 9 | PET | Al(O—iPr)$_3$ | Phosphoric acid | PVA | 1.15 | 15 | 15 | 15 | 2500 | 200 |
| Example 10 | PET | Al(O—iPr)$_3$ | Phosphoric acid | PVA | 1.15 | 15 | 15 | 15 | 1500 | 150 |
| Example 11 | PET | Al(O—iPr)$_3$ | Phosphoric acid | PVA | 1.15 | 15 | 15 | 15 | 1500 | 180 |
| Example 12 | PET | Al(O—iPr)$_3$ | Phosphoric acid | — | 1.15 | 15 | 15 | 15 | 1500 | 200 |
| Example 13 | PET | Al(O—iPr)$_3$ | Phosphoric acid | Starch | 1.15 | 15 | 15 | 15 | 1500 | 200 |
| Example 14 | PET | Al(O—iPr)$_3$ | Phosphoric acid | PAA | 1.15 | 15 | 15 | 15 | 1500 | 200 |
| Example 15 | PET | Al(O—iPr)$_3$ | Combined use | PVA | 1.28 | 15 | 15 | 15 | 1500 | 200 |
| Example 16 | PET | Al(O—iPr)$_3$ | Phosphoric acid | PVA | 1.15 | 15 | 15 | 15 | 1500 | 200 |
| Example 17 | PET | Al(O—iPr)$_3$ | Phosphoric acid | PVA | 1.15 | 15 | 15 | 15 | 1500 | 200 |
| Example 18 | ONY | Al(O—iPr)$_3$ | Phosphoric acid | PVA | 1.15 | 15 | 15 | 15 | 1500 | 180 |
| Example 19 | ONY | Al(O—iPr)$_3$ | Phosphoric acid | PVA | 1.15 | 15 | 15 | 15 | 1500 | 180 |
| Example 20 | (Deposited PET) | Al(O—iPr)$_3$ | Phosphoric acid | PVA | 1.15 | 15 | 15 | 15 | 1500 | 200 |
| Comparative Example 1 | PET | Al(O—iPr)$_3$ | — | PVA | 1.15 | 15 | — | 15 | 500 | 200 |
| Comparative Example 2 | PET | Al(O—iPr)$_3$ | Phosphoric acid | PVA | 4.48 | 15 | 15 | 15 | 1500 | 200 |
| Comparative Example 3 | PET | Al(O—iPr)$_3$ | Phosphoric acid | PVA | 0.82 | 15 | 15 | 15 | 1500 | 200 |
| Comparative Example 4 | PET | Al(O—iPr)$_3$ | Phosphoric acid | PVA | 1.15 | 55 | 55 | 55 | 1500 | 200 |
| Comparative Example 5 | PET | Al(O—iPr)$_3$ | Phosphoric acid | PVA | 1.15 | 15 | 15 | 15 | 1500 | — |

TABLE 1-continued

| | | Layer (Y) | | | | Production method | | | | |
|---|---|---|---|---|---|---|---|---|---|---|
| | | | | | | Temperature (°C.) | | Viscosity (mPa·s) | | Heat |
| | Base (X) | Compound (L) | Phosphorus compound (B) | Polymer (C) | $N_M/N_P$ | Liquid (S) | Solution (T) | Coating liquid (U) | Coating liquid (U) | treatment temperature (°C.) |
| Comparative Example 6 | PET | Al(O—iPr)$_3$ | Phosphoric acid | PVA | 1.15 | 15 | 15 | 15 | 1500 | 130 |
| Comparative Example 7 | PET | Al(NO$_3$)$_3$ | Phosphoric acid | PVA | 1.15 | 15 | 15 | 15 | 500 | — |
| Reference Example 1 | PET | | Alumina deposition | | — | — | — | — | — | — |
| Reference Example 2 | PET | | Silica deposition | | — | — | — | — | — | — |

[Abbreviations in Table]
$N_M/N_P$: The ratio of the number of moles $N_M$ of metal atoms in the metal oxide (A) to the number of moles $N_P$ of phosphorous atoms derived from the phosphorus compound B
PVA: Polyvinyl alcohol, PAA: Polyacrylic acid
(Combined use): Combined use of phosphoric acid and phosphonic acid at a molar ratio of 9:1
(Deposited PET): Silica-deposited PET film

TABLE 2

| | | | XPS | | | | |
|---|---|---|---|---|---|---|---|
| | | | Oxygen 1s | | Aluminum 2p | | |
| | Layer configuration of composite structure (*1) | Appearance | Peak location (eV) | Half width (eV) | Peak location (eV) | Half width (eV) | Total content of Al, O, and P (atom %) |
| Example 1 | Layer (Y)/PET | S | 532.6 | 1.5 | 75.3 | 1.8 | >90 |
| Example 2 | Layer (Y)/PET | S | 532.3 | 1.9 | 75.0 | 1.8 | >90 |
| Example 3 | Layer (Y)/PET | S | 532.3 | 1.7 | 75.2 | 1.8 | >90 |
| Example 4 | Layer (Y)/PET | S | 532.4 | 1.7 | 75.3 | 1.8 | >90 |
| Example 5 | Layer (Y)/PET | S | 532.6 | 1.6 | 75.3 | 1.8 | >90 |
| Example 6 | Layer (Y)/PET | S | 532.4 | 1.9 | 75.2 | 1.8 | >90 |
| Example 7 | Layer (Y)/PET | S | 532.3 | 1.8 | 75.2 | 1.8 | >90 |
| Example 8 | Layer (Y)/PET | S | 532.3 | 1.9 | 75.1 | 1.8 | >90 |
| Example 9 | Layer (Y)/PET | A | 532.6 | 1.5 | 75.3 | 1.8 | >90 |
| Example 10 | Layer (Y)/PET | S | 532.3 | 1.8 | 75.2 | 1.8 | >90 |
| Example 11 | Layer (Y)/PET | S | 532.4 | 1.7 | 75.3 | 1.8 | >90 |
| Example 12 | Layer (Y)/PET | S | 532.7 | 1.4 | 75.3 | 1.8 | >90 |
| Example 13 | Layer (Y)/PET | S | 532.4 | 1.8 | 75.3 | 1.8 | 85 |
| Example 14 | Layer (Y)/PET | S | 532.4 | 1.8 | 75.3 | 1.8 | 88 |
| Example 15 | Layer (Y)/PET | S | 532.5 | 1.6 | 75.3 | 1.8 | >90 |
| Example 16 | Layer (Y)/PET | S | 532.5 | 1.5 | 75.3 | 1.8 | >90 |
| Example 17 | Layer (Y)/PET/Layer (Y) | S | 532.6 | 1.5 | 75.3 | 1.8 | >90 |
| Example 18 | Layer (Y)/ONY | S | 532.4 | 1.7 | 75.3 | 1.8 | >90 |
| Example 19 | Layer (Y)/ONY/Layer (Y) | S | 532.4 | 1.7 | 75.3 | 1.8 | >90 |
| Example 20 | Layer (Y)/Deposited PET | S | 532.6 | 1.5 | 75.3 | 1.8 | >90 |
| Comparative Example 1 | Layer (Y')/PET | S | 532.3 | 2.7 | 74.8 | 1.8 | >90 |
| Comparative Example 2 | Layer (Y')/PET | S | 532.3 | 2.2 | 75.0 | 1.8 | >90 |
| Comparative Example 3 | Layer (Y')/PET | S | 532.4 | 2.0 | 75.1 | 1.8 | >90 |
| Comparative Example 4 | Layer (Y')/PET | A | 532.3 | 2.1 | 75.1 | 1.8 | >90 |
| Comparative Example 5 | Layer (Y')/PET | S | 532.3 | 2.6 | 74.9 | 1.8 | >90 |
| Comparative Example 6 | Layer (Y')/PET | S | 532.3 | 2.0 | 75.1 | 1.8 | >90 |
| Comparative Example 7 | — | B | — | — | — | — | — |
| Reference Example 1 | Layer (Y')/PET | S | 531.4 | 2.7 | 74.2 | 2.0 | — |
| Reference Example 2 | Layer (Y')/PET | S | 532.4 | 2.0 | — | — | — |

(1*) Composite structure subjected to X-ray photoelectron spectroscopy and appearance evaluation

TABLE 3

| | Layer configuration of composite structure (*2) | Moisture permeability (g/(m² · day)) | | |
|---|---|---|---|---|
| | | 0-100 h 85° C. 85/0% RH | 1900-2000 h 85° C. 85/0% RH | 40° C. 90/0% RH |
| Example 1 | PET//Layer (Y)/PET//CPP | 0.8 | 0.5 | 0.020 |
| Example 2 | PET//Layer (Y)/PET//CPP | 4.7 | 9.5 | 0.081 |
| Example 3 | PET//Layer (Y)/PET//CPP | 1.4 | 1.8 | 0.025 |
| Example 4 | PET//Layer (Y)/PET//CPP | 1.1 | 1.3 | 0.020 |
| Example 5 | PET//Layer (Y)/PET//CPP | 0.9 | 0.9 | 0.019 |
| Example 6 | PET//Layer (Y)/PET//CPP | 1.8 | 2.6 | 0.038 |
| Example 7 | PET//Layer (Y)/PET//CPP | 1.6 | 2.0 | 0.035 |
| Example 8 | PET//Layer (Y)/PET//CPP | 2.2 | 3.4 | 0.045 |
| Example 9 | PET//Layer (Y)/PET//CPP | 0.8 | 0.5 | 0.018 |
| Example 10 | PET//Layer (Y)/PET//CPP | 4.9 | 8.7 | 0.090 |
| Example 11 | PET//Layer (Y)/PET//CPP | 1.2 | 1.3 | 0.026 |
| Example 12 | PET//Layer (Y)/PET//CPP | 0.7 | 0.5 | 0.015 |
| Example 13 | PET//Layer (Y)/PET//CPP | 1.0 | 1.9 | 0.023 |
| Example 14 | PET//Layer (Y)/PET//CPP | 1.0 | 1.8 | 0.025 |
| Example 15 | PET//Layer (Y)/PET//CPP | 0.9 | 1.0 | 0.019 |
| Example 16 | PET//Layer (Y)/PET//CPP | 0.8 | 0.6 | 0.022 |
| Example 17 | PET//Layer (Y)/PET/Layer (Y)//CPP | 0.5 | 0.3 | 0.002 |
| Example 18 | PET//Layer (Y)/ONY//CPP | 1.5 | 3.9 | 0.031 |
| Example 19 | PET//Layer (Y)/ONY/Layer (Y)//CPP | 0.9 | 1.6 | 0.008 |
| Example 20 | PET//Layer (Y)/Deposited PET//CPP | 0.6 | 0.4 | 0.011 |
| Comparative Example 1 | PET//Layer (Y')/PET//CPP | >100 | >100 | 42 |
| Comparative Example 2 | PET//Layer (Y')/PET//CPP | 30.6 | 89.9 | 0.612 |
| Comparative Example 3 | PET//Layer (Y')/PET//CPP | 13.1 | 30.0 | 0.273 |
| Comparative Example 4 | PET//Layer (Y')/PET//CPP | 5.2 | 12.5 | 0.126 |
| Comparative Example 5 | PET//Layer (Y')/PET//CPP | >100 | >100 | 45 |
| Comparative Example 6 | PET//Layer (Y')/PET//CPP | 24.4 | 78.7 | 0.524 |
| Comparative Example 7 | — | — | — | — |
| Reference Example 1 | PET//Layer (Y')/PET//CPP | 17.0 | 50.2 | 0.330 |
| Reference Example 2 | PET//Layer (Y')/PET//CPP | 5.5 | 15.3 | 0.119 |

(*2) Composite structure subjected to moisture permeability measurement
"//" in the table represents an adhesive layer.

As is clear from the tables, the composite structures of Examples were able to maintain the water vapor barrier properties at high levels over a long period time even when stored at high temperatures and high humidities of 40° C. and 90/0% RH and 85° C. and 85/0% RH. In addition, the composite structures of Examples had good appearance.

Example 21

In Example 21, a vertical form fill seal pouch was fabricated using a composite structure of the present invention. First, the composite structure (A1) was fabricated in the same manner as in Example 1. Next, a two-component adhesive agent ("A-520" (trade name) and "A-50" (trade name) manufactured by Mitsui Takeda Chemicals, Inc.) was coated onto the composite structure (A1) and then dried. The thus-prepared product and an oriented nylon film (ONY described above) were laminated to obtain a layered body. Subsequently, a two-component adhesive agent ("A-520" (trade name) and "A-50" (trade name) manufactured by Mitsui Takeda Chemicals, Inc.) was coated onto the oriented nylon film of the layered body and then dried. The thus-prepared product and a non-oriented polypropylene film (RXC-21 (trade name) manufactured by Tohcello Co., Ltd. and having a thickness of 70 μm) were laminated (this film may be abbreviated as "CPP 70" hereinafter). In this manner, a composite structure (C21) having a configuration of PET/layer (Y1)/adhesive agent/ONY/adhesive agent/CPP70 was obtained.

Next, the composite structure (C21) was cut into a 400-nm wide piece, which was fed to a vertical form fill packaging machine (manufactured by ORIHIRO Co., Ltd.) so that a vertical form fill seal pouch of fin seal type (having a width of 160 mm and a length of 470 mm) was fabricated. Next, the vertical form fill seal pouch formed by the composite structure (C21) was filled with 2 kg of water using the form fill packaging machine. The processability of the composite structure (C21) in the form fill packaging machine was good, and no defects such as wrinkles and streaks were observed in the appearance of the obtained vertical form fill seal pouch.

Example 22

In Example 22, a vacuum packaging pouch was fabricated using a composite structure of the present invention. First, the composite structure (A1) was fabricated in the same manner as in Example 1. Next, a two-component adhesive agent ("A-520" (trade name) and "A-50" (trade name) manufactured by Mitsui Takeda Chemicals, Inc.) was coated onto an oriented nylon film (ONY described above) and then dried. The thus-prepared product and the composite structure (A1) were laminated. Next, a two-component adhesive agent ("A-

520" (trade name) and "A-50" (trade name) manufactured by Mitsui Takeda Chemicals, Inc.) was coated onto the composite structure (A1) of the laminate and then dried. The thus-prepared product and a non-oriented polypropylene film (CPP 70 described above) were laminated. In this manner, a composite structure (C22) having a configuration of ONY/adhesive agent/layer (Y1)/PET/adhesive agent//CPP 70 was obtained.

Next, two layered bodies having the shape of a 22 cm×30 cm rectangle were cut from the composite structure (C22). The two pieces of the composite structure (C22) were stacked on each other in such a manner that the CPP 70 were located interiorly. Then, the three sides of the rectangle were heat-sealed to form a pouch. Wood spheres (having a diameter of 30 mm) were used as a model of a solid food, and the pouch was filled with the spheres arranged in a single layer so that the spheres were in contact with each other. Thereafter, the air inside the pouch was removed by degassing, the remaining one side was heat-sealed, and thus a vacuum packaging pouch was fabricated. In the obtained vacuum packaging pouch, the composite structure (C22) was in close contact with the spheres along the irregularities of the surfaces of the spheres.

Example 23

In Example 23, a spout pouch was fabricated using a composite structure of the present invention. First, a composite structure (C23) having a configuration of PET/layer (Y1)/adhesive agent/ONY/adhesive agent/CPP 70 was obtained in the same manner as in Example 21. Next, the composite structure (C23) was cut into two pieces having a predetermined shape, and then the two pieces of the composite structure (C23) were stacked on each other in such a manner that the CPP 70 were located interiorly. The periphery of the stack was heat-sealed, and a spout made of polypropylene was attached by heat sealing. In this manner, a spout pouch of the flat type was able to be fabricated without any problem.

Example 24

In Example 24, a laminated tube container was fabricated using a composite structure of the present invention. First, the composite structure (A1) was fabricated in the same manner as in Example 1. Next, a two-component adhesive agent ("A-520" (trade name) and "A-50" (trade name) manufactured by Mitsui Takeda Chemicals, Inc.) was coated onto two non-oriented polypropylene films (RXC-21 (trade name) manufactured by Tohcello Co., Ltd. and having a thickness of 100 μm) and then dried (these films may be abbreviated as "CPP 100" hereinafter). The thus-prepared products were laminated with the composite structure (A1). In this manner, a composite structure (C24) having a configuration of CPP100/adhesive agent/layer (Y1)/PET/adhesive agent/CPP100 was obtained.

Next, the composite structure (C24) was cut into a predetermined shape, and then formed into a tubular shape. The overlapping portion was heat-sealed, and thus a tubular body was fabricated. Next, the tubular body was mounted to a mandrel for tube container formation, and a circular truncated cone-shaped shoulder portion and a head portion continuous with the shoulder portion were formed at one end of the tubular body. The shoulder portion and the head portion were formed by compression molding of a polypropylene resin. Next, a cap made of polypropylene resin was attached to the head portion. Next, the other open end of the tubular body was heat-sealed. In this manner, a laminated tube container was able to be fabricated without any problem.

Example 25

In Example 25, an infusion bag was fabricated using a composite structure of the present invention. First, a composite structure (C25) having a configuration of PET/layer (Y1)/adhesive agent/ONY/adhesive agent/CPP70 was obtained in the same manner as in Example 21. Next, the composite structure (C25) was cut into two pieces having a predetermined shape, and then the two pieces of the composite structure (C25) were stacked on each other in such a manner that the CPP 70 were located interiorly. The periphery of the stack was heat-sealed, and a spout made of polypropylene was attached by heat sealing. In this manner, an infusion bag was able to be fabricated without any problem.

Example 26

In Example 26, a container cover was fabricated using a composite structure of the present invention. First, a composite structure (C26) having a configuration of PET/layer (Y1)/adhesive agent/ONY/adhesive agent/CPP70 was obtained in the same manner as in Example 21. Next, the composite structure (C26) was cut into the form of a circular container cover having a diameter of 88 mm. Also prepared was a cylindrical container (Hi-Retoflex HR78-84 manufactured by Toyo Seikan Co., Ltd.) having a three-layer configuration of polyolefin layer/steel layer/polyolefin layer and having a diameter of 78 mm, a flange width of 6.5 mm, and a height of 30 mm. This container was almost fully filled with water, and the container cover made of the composite structure (C26) was heat-sealed to the flange portion. In this manner, a covered container using the container cover was able to be fabricated without any problem.

Example 27

In Example 27, a paper container was fabricated using a composite structure of the present invention. First, the composite structure (A1) was fabricated in the same manner as in Example 1. Next, an adhesive agent was applied onto both surfaces of a 400 g/m² paper board, and then a polypropylene resin (which may be abbreviated as "PP" hereinafter) was extrusion-laminated to the both surfaces to form PP layers (each having a thickness of 20 μm) on the both surfaces of the paper board. Thereafter, an adhesive agent was applied to the surface of one of the PP layers, and the composite structure (A1) was laminated onto surface of the PP layer. Furthermore, an adhesive agent was applied to the surface of the composite structure (A1), which was then adhered to a non-oriented polypropylene film (CPP 70 described above). In this manner, a composite structure (C27) having a configuration of PP/paper board/PP/adhesive agent/layer (Y1)/PET/adhesive agent/CPP 70 was fabricated. In the fabrication of the composite structure (C27), an anchor coat agent was used as necessary. Using the thus-obtained composite structure (C27), a brick-shaped paper container was able to be fabricated without any problem.

Example 28

In Example 28, a vacuum insulator was fabricated using a composite structure of the present invention. First, a composite structure (C28) having a configuration of ONY/adhesive agent/layer (Y1)/PET/adhesive agent/CPP70 was obtained in the same manner as in Example 22. Next, the composite structure (C28) was cut into two pieces having a predetermined rectangular shape, and then the two pieces of the composite structure (C28) were stacked on each other in such a manner that the CPP 70 were located interiorly. The three sides of the rectangle were heat-sealed to form a pouch. Next, a heat-insulating core material was put into the pouch through the opening of the pouch, and the pouch was hermetically sealed using a vacuum packaging machine (VAC-STAR 2500 manufactured by Frimark GmbH) so that the internal temperature was 20° C. and the internal pressure was 10 Pa. In this manner, a vacuum insulator was able to be fabricated without any problem. As the heat-insulating core material, a silica fine powder dried in a 120° C. atmosphere for 4 hours was used.

Example 29

In Example 29, a solar cell module was fabricated using a composite structure of the present invention. First, the composite structure (A1) was fabricated in the same manner as in Example 1. Next, an amorphous silicon solar cell placed on a 10-cm square reinforced glass was enclosed by a 450-μm thick ethylene-vinyl acetate copolymer film, onto which the composite structure (A1) was attached in such a manner that the layer (Y1) faced the film. Thus, a solar cell module was fabricated. The attachment was carried out by performing vacuum drawing at 150° C. for 3 minutes and then performing pressure bonding for 9 minutes. The thus-fabricated solar cell module operated well, and exhibited good electrical output characteristics even in the environment having a temperature of 85° C. and a humidity of 85/0% RH.

INDUSTRIAL APPLICABILITY

The composite structure of the present invention is excellent in water vapor barrier properties and has good appearance. In addition, the composite structure maintains the water vapor barrier properties at a high level over a long period of time even when used at high temperature and high humidity. Therefore, the composite structure of the present invention can be preferably used as a packaging material for foods, chemicals, medical devices, industrial materials, and garments.

Examples of uses other than use as a packaging material include uses as the following: an electronic device-related film such as a substrate film for LCDs, a substrate film for organic EL devices, a substrate film for electronic paper, a sealing film for electronic devices, a film for PDPs, a film for LEDs, a film for IC tags, a back sheet for solar cells, and a protective film for solar cells; a member for optical communication; a flexible film for electronic equipment; a barrier membrane for fuel cells; a sealing film for fuel cells; and a substrate film for various functional films.

The invention claimed is:

1. A composite structure, comprising:
a base (X), and
a layer (Y) stacked on the base (X),
wherein
the layer (Y) comprises a reaction product (R),
the reaction product (R) is obtained by a process comprising: reacting at least a metal oxide (A) and a phosphorus compound (B), and
a peak for a binding energy of an oxygen-atom 1s orbital observed by X-ray photoelectron spectroscopy of the layer (Y) is located at 532.0 eV or higher, and the peak has a half width of less than 2.0 eV.

2. The composite structure according to claim 1, wherein a sum of number of metal atoms (M) of the metal oxide (A), number of oxygen atoms, and number of phosphorus atoms accounts for 60% or more of a total number of atoms in the layer (Y) calculated by X-ray photoelectron spectroscopy.

3. The composite structure according to claim 1, wherein the metal oxide (A) is a hydrolytic condensate of a compound (L) comprising: a metal atom (M), and a hydrolyzable characteristic group bonded to the metal atom (M).

4. The composite structure according to claim 3, wherein the compound (L) comprises a compound ($L^1$) represented by formula (I):

$$M^1X^1_m R^1_{(n-m)} \qquad (I),$$

wherein:
$M^1$ is a metal atom selected from the group consisting of Al, Ti, and Zr;
each $X^1$ is independently selected from the group consisting of F, Cl, Br, I, $R^2O-$, $R^3C(=O)O-$, $(R^4C(=O))_2CH-$, and $NO_3$;
each $R^1$, each $R^2$, each $R^3$, and each $R^4$ are independently selected from the group consisting of an alkyl group, an aralkyl group, an aryl group, and an alkenyl group;
n is equal to a valence of $M^1$; and
m represents an integer of from 1 to n.

5. The composite structure according to claim 4, wherein the metal atom $M^1$ in the formula (I) is aluminum, and a peak for a binding energy of an aluminum-atom 2p orbital observed by X-ray photoelectron spectroscopy of the layer (Y) is located at 74.5 eV or higher, and the peak has a half width of less than 2.0 eV.

6. The composite structure according to claim 4, wherein the compound ($L^1$) comprises at least one compound selected from the group consisting of aluminum triisopropoxide and aluminum tri-s-butoxide.

7. The composite structure according to claim 1, wherein the phosphorus compound (B) comprises a plurality of sites reactable with the metal oxide (A).

8. The composite structure according to claim 1, wherein the phosphorus compound (B) is at least one compound selected from the group consisting of phosphoric acid, polyphosphoric acid, phosphorous acid, phosphonic acid, and derivatives thereof.

9. The composite structure according to claim 1, wherein, in the layer (Y), a molar number $N_M$ of metal atoms (M) of the metal oxide (A) and a molar number $N_P$ of phosphorus atoms derived from the phosphorus compound (B) satisfy a relation of $1.0 \leq N_M/N_P \leq 3.6$.

10. The composite structure according to claim 1, wherein the layer (Y) further comprises a polymer (C) comprising at least one functional group (f) selected from the group consisting of a hydroxyl group, a carboxyl group, a carboxylic acid anhydride group, and a salt of a carboxyl group.

11. The composite structure according to claim 10, wherein the polymer (C) is at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

12. The composite structure according to claim 1, wherein the base (X) comprises at least one layer selected from the group consisting of a thermoplastic resin film layer, a paper layer, and an inorganic deposited layer.

13. The composite structure according to claim 1, wherein the layer (Y) is stacked on both surfaces of the base (X).

14. The composite structure according to claim 1, having a moisture permeability under conditions of 40° C. and 90/0% RH is 0.1 g/(m²·day) or less.

15. The composite structure according to claim 1, wherein when a moisture permeability under conditions of 85° C. and 85/0% RH is measured continuously for 100 hours, an average moisture permeability during a period from 0 to 100 hours of said composite structure is 5 g/(m²·day) or less.

16. The composite structure according to claim 1, wherein when a moisture permeability under conditions of 85° C. and 85/0% RH is measured continuously for 2000 hours, an average moisture permeability during a period from 1900 to 2000 hours of said composite structure is 5 g/(m²·day) or less.

17. A product, comprising the composite structure according to claim 1,
wherein the composite structure is suitable as a packaging material, a solar cell component, or a display device component.

18. The composite structure according to claim 1, wherein the peak for a binding energy of an oxygen-atom 1s orbital observed by X-ray photoelectron spectroscopy of the layer (Y) is located at 532.0 eV to 533.0 eV, and the half width of the peak is in the range of 1.4 eV to 1.9 eV.

19. The composite structure according to claim 1, wherein the peak for a binding energy of an oxygen-atom 1s orbital observed by X-ray photoelectron spectroscopy of the layer (Y) is located at 532.5 eV or higher, and the peak has a half width of less than 1.7 eV.

20. The composite structure according to claim 1, wherein a total thickness of all layers (Y) is 4.0 µm or less.

21. The composite structure according to claim 1, wherein a total thickness of all layers (Y) is 2.0 µm or less.

22. The composite structure according to claim 1, wherein a total thickness of all layers (Y) is 0.9 µm or less.

23. The composite structure according to claim 1, wherein:
the metal oxide (A) is a hydrolytic condensate of a compound (L) comprising: a metal atom (M), and a hydrolyzable characteristic group bonded to the metal atom (M);
compound (L) comprises a compound (L¹) represented by formula (I):

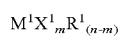
(I), wherein:
M¹ is a metal atom selected from the group consisting of Al, Ti, and Zr;
each X¹ is independently selected from the group consisting of F, Cl, Br, I, R²O—, R³C(=O)O—, (R⁴C(=O))₂CH—, and NO₃;
each R¹, each R², each R³, and each R⁴ are independently selected from the group consisting of an alkyl group, an aralkyl group, an aryl group, and an alkenyl group;
n is equal to a valence of M¹; and
m represents an integer of from 1 to n;
a total thickness of all layers (Y) is 4.0 µm or less; and
wherein said composite structure has at least one of the following moisture permeabilities a)-c):
a) a moisture permeability under conditions of 40° C. and 90/0% RH of 0.1 g/(m²·day) or less;
b) a moisture permeability under conditions of 85° C. and 85/0% RH measured continuously for 100 hours, an average moisture permeability during a period from 0 to 100 hours of 5 g/(m²·day) or less;
c) a moisture permeability under conditions of 85° C. and 85/0% RH measured continuously for 2000 hours, an average moisture permeability during a period from 1900 to 2000 hours of 5 g/(m²·day) or less.

24. The composite structure according to claim 23, wherein
the metal atom M¹ in the formula (I) is aluminum, and
a peak for a binding energy of an aluminum-atom 2p orbital observed by X-ray photoelectron spectroscopy of the layer (Y) is located at 74.5 eV or higher, and the peak has a half width of less than 2.0 eV.

25. The composite structure according to claim 23, wherein the compound (L¹) comprises at least one compound selected from the group consisting of aluminum triisopropoxide and aluminum tri-s-butoxide.

26. The composite structure according to claim 23, wherein the peak for a binding energy of an oxygen-atom 1s orbital observed by X-ray photoelectron spectroscopy of the layer (Y) is located at 532.0 eV to 533.0 eV, and the half width of the peak is in the range of 1.4 eV to 1.9 eV.

* * * * *